United States Patent
Yoshida et al.

(10) Patent No.: US 12,242,143 B2
(45) Date of Patent: Mar. 4, 2025

(54) OPTICAL DEVICE AND OPTICAL COMMUNICATION APPARATUS

(71) Applicant: Fujitsu Optical Components Limited, Kawasaki (JP)

(72) Inventors: Yoshihiko Yoshida, Sapporo (JP); Nobuaki Mitamura, Saitama (JP); Shuntaro Makino, Kawasaki (JP); Yoshinobu Kubota, Yokohama (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 177 days.

(21) Appl. No.: 17/699,746

(22) Filed: Mar. 21, 2022

(65) Prior Publication Data
US 2022/0373828 A1    Nov. 24, 2022

(30) Foreign Application Priority Data

May 18, 2021   (JP) .................................. 2021-083567

(51) Int. Cl.
G02F 1/03 (2006.01)
G02F 1/035 (2006.01)
H04B 10/50 (2013.01)

(52) U.S. Cl.
CPC ............ G02F 1/035 (2013.01); G02F 1/0316 (2013.01); G02F 1/0327 (2013.01); *G02F 2201/16* (2013.01); *G02F 2202/105* (2013.01); *H04B 10/501* (2013.01)

(58) Field of Classification Search
CPC ...... G02F 1/035; G02F 1/0316; G02F 1/0327; G02F 2201/16; G02F 2202/105; H04B 10/501
See application file for complete search history.

(56) References Cited

U.S. PATENT DOCUMENTS 4,448,479 A * 5/1984 Alferness .............. G02F 1/0356
                                                              385/28
5,189,713 A    2/1993 Shaw
(Continued)

FOREIGN PATENT DOCUMENTS

JP    2000-329959 A    11/2000
JP    2003-195239 A    7/2003
(Continued)

OTHER PUBLICATIONS

Abouelez, Ahmed. (2020). Photonic generation of millimeter-wave signal through frequency 12-tupling using two cascaded dual-parallel polarization modulators. Optical and Quantum Electronics. 52. 2020. (Year: 2020).*

(Continued)

*Primary Examiner* — Peter Radkowski
(74) *Attorney, Agent, or Firm* — STAAS & HALSEY LLP

(57) ABSTRACT

An optical device includes a silicon substrate, a waveguide formed of a thin film that is laminated on the silicon substrate and that is made of a perovskite oxide with a large electro-optic effect as compared to lithium niobate, and a cladding layer that covers the waveguide. Further, the optical device includes ground electrode that has a ground potential and a signal electrode that is arranged at a position facing the ground electrode and that applies driving voltage to the waveguide.

19 Claims, 20 Drawing Sheets

(56) References Cited

U.S. PATENT DOCUMENTS

| | | | | |
|---|---|---|---|---|
| 5,787,211 | A * | 7/1998 | Gopalakrishnan | G02F 1/2255 385/2 |
| 6,483,953 | B1 * | 11/2002 | McBrien | G02F 1/0356 385/2 |
| 6,580,840 | B1 * | 6/2003 | McBrien | G02F 1/2255 385/2 |
| 6,836,573 | B2 * | 12/2004 | Soda | G02F 1/3133 385/2 |
| 7,095,920 | B1 | 8/2006 | Little | |
| 7,286,727 | B2 * | 10/2007 | Sugiyama | G02F 1/035 385/14 |
| 7,382,942 | B2 * | 6/2008 | Mitomi | G02B 6/125 385/9 |
| 7,426,321 | B2 * | 9/2008 | Eriksson | G02F 1/035 385/2 |
| 7,471,853 | B2 * | 12/2008 | Sugiyama | G02F 1/225 385/2 |
| 7,603,002 | B2 * | 10/2009 | Sugiyama | G02F 1/2255 385/40 |
| 7,627,213 | B2 * | 12/2009 | Sugiyama | G02F 1/0356 385/11 |
| 7,630,587 | B2 * | 12/2009 | Sugiyama | G02F 1/225 385/2 |
| 7,668,409 | B2 * | 2/2010 | Sugiyama | G02F 1/0356 385/14 |
| 7,801,400 | B2 * | 9/2010 | Sugiyama | G02F 1/035 385/32 |
| 7,995,872 | B2 * | 8/2011 | Aoki | G02F 1/225 385/2 |
| 8,218,914 | B2 * | 7/2012 | Kissa | G02F 1/0121 385/40 |
| 8,233,752 | B2 * | 7/2012 | Ide | G02B 6/125 385/32 |
| 8,346,025 | B2 * | 1/2013 | Gill | G02F 1/2257 438/31 |
| 8,406,576 | B2 * | 3/2013 | Sugiyama | G02F 1/0356 385/2 |
| 8,411,349 | B2 * | 4/2013 | Mitomi | G02F 1/2255 359/254 |
| 8,530,821 | B2 * | 9/2013 | Green | G02F 1/025 250/227.12 |
| 8,737,773 | B2 * | 5/2014 | Motoya | G02F 1/2255 385/2 |
| 8,774,569 | B2 * | 7/2014 | Dougherty | B82Y 20/00 385/14 |
| 8,849,071 | B2 * | 9/2014 | Kissa | G02F 1/225 385/50 |
| 9,372,381 | B2 * | 6/2016 | Vermeulen | G02F 1/2257 |
| 9,519,200 | B2 * | 12/2016 | Kataoka | G02F 1/2255 |
| 9,671,670 | B2 * | 6/2017 | Hollis | G02B 6/14 |
| 9,746,743 | B1 * | 8/2017 | Rabiei | G02B 6/12009 |
| 9,810,964 | B2 * | 11/2017 | Porte | G02F 1/365 |
| 9,817,249 | B2 * | 11/2017 | Doerr | G02F 1/011 |
| 10,295,847 | B1 * | 5/2019 | Tytgat | G02F 1/2257 |
| 10,466,567 | B1 * | 11/2019 | Vera Villarroel | G02F 1/2255 |
| 10,530,487 | B2 * | 1/2020 | Ding | H04B 10/5561 |
| 10,955,723 | B2 * | 3/2021 | Sugiyama | G02F 1/2257 |
| 11,048,139 | B2 * | 6/2021 | Zhou | G02F 1/2255 |
| 11,327,384 | B2 * | 5/2022 | Mistry | G02B 27/283 |
| 11,378,825 | B2 * | 7/2022 | Kissa | G02F 1/025 |
| 11,378,826 | B2 * | 7/2022 | Kissa | G02F 1/011 |
| 2003/0128905 | A1 | 7/2003 | Kambe et al. | |
| 2004/0047529 | A1 * | 3/2004 | Soda | G02F 1/3133 385/2 |
| 2006/0023288 | A1 * | 2/2006 | McBrien | G02F 1/0356 359/245 |
| 2006/0159384 | A1 * | 7/2006 | Sugiyama | G02F 1/0356 385/14 |
| 2006/0210212 | A1 * | 9/2006 | Sugiyama | G02F 1/035 385/40 |
| 2007/0009195 | A1 * | 1/2007 | Eriksson | G02F 1/035 385/40 |
| 2007/0104407 | A1 * | 5/2007 | Mitomi | G02B 6/125 385/9 |
| 2008/0056637 | A1 * | 3/2008 | Sugiyama | G02F 1/225 385/3 |
| 2008/0095485 | A1 * | 4/2008 | Sugiyama | G02F 1/0356 385/3 |
| 2008/0260321 | A1 * | 10/2008 | Sugiyama | G02F 1/035 385/3 |
| 2008/0317399 | A1 * | 12/2008 | Sugiyama | G02F 1/0356 385/3 |
| 2009/0231686 | A1 * | 9/2009 | Atkins | G02F 1/39 385/28 |
| 2009/0274408 | A1 * | 11/2009 | Aoki | G02F 1/225 385/2 |
| 2009/0290206 | A1 * | 11/2009 | Sugiyama | G02F 1/2255 359/254 |
| 2009/0324163 | A1 * | 12/2009 | Dougherty | G02B 6/1228 385/14 |
| 2009/0324165 | A1 * | 12/2009 | Sugiyama | G02F 1/035 264/1.24 |
| 2010/0111464 | A1 * | 5/2010 | Kissa | G02F 1/2255 385/2 |
| 2010/0260461 | A1 | 10/2010 | Shimizu et al. | |
| 2010/0290732 | A1 * | 11/2010 | Gill | B29D 11/00663 385/3 |
| 2010/0329601 | A1 * | 12/2010 | Ide | G02B 6/125 385/3 |
| 2011/0081107 | A1 * | 4/2011 | Sugiyama | G02F 1/2255 385/2 |
| 2011/0157673 | A1 * | 6/2011 | Mitomi | G02F 1/2255 359/279 |
| 2011/0158576 | A1 * | 6/2011 | Kissa | G02F 1/225 385/2 |
| 2011/0298561 | A1 * | 12/2011 | Green | G02F 1/0121 333/236 |
| 2012/0230627 | A1 * | 9/2012 | Motoya | G02F 1/0356 385/3 |
| 2012/0230630 | A1 * | 9/2012 | Dougherty | B82Y 20/00 385/14 |
| 2013/0343693 | A1 * | 12/2013 | Doerr | G02F 1/011 385/3 |
| 2014/0112611 | A1 * | 4/2014 | Vermeulen | G02F 1/225 385/3 |
| 2015/0070709 | A1 * | 3/2015 | Porte | G01B 9/02049 356/482 |
| 2016/0054637 | A1 * | 2/2016 | Kataoka | G02F 1/2255 385/2 |
| 2016/0202592 | A1 * | 7/2016 | Hollis | G02F 1/2255 385/2 |
| 2016/0313579 | A1 | 10/2016 | Yokoyama et al. | |
| 2017/0163000 | A1 * | 6/2017 | Evans | H01S 5/1028 |
| 2017/0163001 | A1 * | 6/2017 | Evans | H04B 10/572 |
| 2017/0201070 | A1 * | 7/2017 | Evans | H01S 5/4025 |
| 2019/0155064 | A1 * | 5/2019 | Tytgat | G02F 1/2257 |
| 2019/0253149 | A1 * | 8/2019 | Ding | G02F 1/0123 |
| 2019/0271896 | A1 * | 9/2019 | Sugiyama | G02F 1/218 |
| 2019/0324345 | A1 * | 10/2019 | Vera Villarroel | G02F 1/2255 |
| 2019/0361315 | A1 * | 11/2019 | Zhou | G02F 1/025 |
| 2021/0080796 | A1 * | 3/2021 | Kissa | G02F 1/0356 |
| 2021/0080797 | A1 * | 3/2021 | Kissa | G02F 1/011 |
| 2022/0043321 | A1 * | 2/2022 | Mistry | G02B 27/283 |

FOREIGN PATENT DOCUMENTS

| | | |
|---|---|---|
| JP | 2018-081975 A | 5/2018 |
| JP | 2009-080378 | 4/2024 |
| WO | WO 2009/078248 A1 | 6/2009 |
| WO | WO 2015/087988 A1 | 6/2015 |
| WO | WO 2020/218975 A1 | 10/2020 |

OTHER PUBLICATIONS

Akiyama et al., High-speed and efficient silicon modulator based on forward-biased pin diodes, High-Front. Phys., Nov. 20, 2014, Sec. Interdisciplinary Physics vol. 2—2014 https://doi.org/10.3389/fphy.2014.00065 (Year: 2014).*

(56) References Cited

OTHER PUBLICATIONS

Allcock et al., Heating rate and electrode charging measurements in a scalable, microfabricated, surface-electrode ion trap, Appl. Phys. B 107, 913 (2012) (Year: 2012).*
Ban et al., "High electro-optic coefficient lead zirconate titanate films toward low-power and compact modulators," Opt. Mater. Express 11, 1733-1741 (2021) (Year: 2021).*
Bitar et al., Multi-pole multi-zero frequency-independent phase-shifter, Rev Sci Instrum 83, 114703 (2012) https://doi.org/10.1063/1.4767240 (Year: 2012).*
Blaicher et al. Hybrid multi-chip assembly of optical communication engines by in situ 3D nano-lithography. Light Sci Appl 9, 71 (2020). https://doi.org/10.1038/s41377-020-0272-5 (Year: 2020).*
Guo et al., Epitaxial integration of BaTiO3 on Si for electro-optic applications, Journal of Vacuum Science & Technology A 39, 030804 (2021) (Year: 2021).*
Hasan et al., Ultra-High Resolution Wideband on-Chip Spectrometer, in IEEE Photonics Journal, vol. 12, No. 5, pp. 1-17, Oct. 2020, Art No. 6802617, (Year: 2020).*
He et al., High-performance hybrid silicon and lithium niobate Mach-Zehnder modulators for 100 Gbits-1 and beyond. Nat. Photonics 13, 359-364 (2019) (Year: 2019).*
Kodigala et al. Lasing action from photonic bound states in continuum. Nature 541, 196-199 (2017). https://doi.org/10.1038/nature20799 (Year: 2017).*
Kumar et al., High speed optical 4-bit twisted ring counter using electro-optic effect of Mach-Zehnder interferometer, Opt Quant Electron (2016) 48:42 (Year: 2016).*
Lewen et al., Ultra high-speed segmented traveling-wave electroabsorption modulators, OSA/OFC 2003, PD38-1 (Year: 2003).*
Lin et al., High-performance polarization management devices based on thin-film lithium niobate. Light: Science & Applications. 2022. (Year: 2022).*
Patel et al., "Design, analysis, and transmission system performance of a 41 GHz silicon photonic modulator," Opt. Express 23, 14263-14287 (2015) (Year: 2015).*
Peairs, Gregory Alexander, Fast and e_cient transducers for microwave-optical quantum communication, Dissertation, University of California, Santa Barbara, 2019, https://escholarship.org/uc/item/0dd4s9s4 (Year: 2019).*
Shao et al., "Microwave-to-optical conversion using lithium niobate thin-film acoustic resonators," Optica 6, 1498-1505 (2019) (Year: 2019).*
Stepanenko et al. Optimization of RF electrodes for electro-optic modulator based on quantum-confined Stark effect, 2019 J. Phys.: Conf. Ser. 1145 012028 (Year: 2019).*
Tadesse et al., Sub-optical wavelength acoustic wave modulation of integrated photonic resonators at microwave frequencies. Nat Commun. Nov. 17, 2014; 5: 5402 (Year: 2014).*
Wang, Cheng, Lithium Niobate Nonlinear Nanophotonics, Dissertation, SEAS, Harvard University, 2017 (Year: 2017).*
Wang et al., "Nanophotonic lithium niobate electro-optic modulators," Opt. Express 26, 1547-1555 (2018) (Year: 2018).*
Wang et al., "Ultrahigh-efficiency wavelength conversion in nanophotonic periodically poled lithium niobate waveguides," Optica 5, 1438-1441 (2018) (Year: 2018).*
Xu et al. High-performance coherent optical modulators based on thin-film lithium niobate platform. Nat Commun 11, 3911 (2020). (Year: 2020).*
Xu et al., Silicon Integrated Nanophotonic Devices for On-Chip Multi-Mode Interconnects. Appl. Sci. 2020, 10, 6365. (Year: 2020).*
Yudistira et al., Surface acoustic wave generation in—cut superlattices using coplanar electrodes, Appl. Phys. Lett. 95, 052901 (2009) (Year: 2009).*
Zhang et al., Integrated lithium niobate electro-optic modulators: when performance meets scalability, 652 vol. 8, No. 5 / May 2021 / Optica Review (Year: 2021).*
Zhao et al., High-performance silicon polarization switch based on a Mach-Zehnder interferometer integrated with polarization-dependent mode converters, Nanophotonics, vol. 11, No. 10, 2022, pp. 2293-2301. (Year: 2022).*
Ansari et al., Si-Photonic Integrated PZT Thin Film for Acousto-Optic Modulation, 2020 Conference on Lasers and Electro-Optics (CLEO), San Jose, CA, USA, 2020, pp. 1-2 (Year: 2020).*
Mingbo He et al.; "High-performance hybrid silicon and lithium niobate Mach-Zehender modulators for 100 Gbit/s and beyond"; Nature Photonics, vol. 13, May 2019, 359-364 (21 pages).
Felix Eltes et al., "A $BaTiO_3$ —Based Electro-Optic Pockels Modulator Monolithically Integrated on an Advanced Silicon Photonics Platform", Journal of Lightwave Technology, vol. 37, No. 5, Mar. 1, 2019*.
Japanese Office Action issued in counterpart Japanese Application No. 2021-083567 dated Jul. 23, 2024.
Japanese Office Action issued in corresponding Japanese Application No. 2021-083567 dated Jan. 7, 2025.

* cited by examiner

OPTICAL DEVICE AND OPTICAL COMMUNICATION APPARATUS

CROSS-REFERENCE TO RELATED APPLICATION

This application is based upon and claims the benefit of priority of the prior Japanese Patent Application No. 2021-083567, filed on May 18, 2021, the entire contents of which are incorporated herein by reference.

FIELD

The embodiments discussed herein are related to an optical device and an optical communication apparatus.

BACKGROUND

In general, for example, an optical device, such as an optical modulator, includes an optical modulator chip that has a surface on which an optical waveguide is formed. A signal electrode is arranged on the optical waveguide of the optical modulator chip, and if voltage is applied to the signal electrode, an electric field in a direction perpendicular to the surface of the optical modulator chip is generated inside the optical waveguide. A refractive index of the optical waveguide is changed by the electric field and a phase of light that propagates through the optical waveguide is changed, so that it becomes possible to modulate the light. In other words, the optical waveguide of the optical modulator chip constitutes, for example, a Mach-Zehnder interferometer and is able to output, for example, an IQ signal that is x- and y-polarized due to a phase difference of light between a plurality of optical waveguides that are arranged in parallel.

When the optical modulator chip performs high-speed modulation, a high-speed signal with a bandwidth of dozens of GHz is input to the signal electrode that is arranged along the optical waveguide, for example.

Further, as the optical waveguide, for example, a thin-film optical waveguide using a thin film made of a lithium niobate (LN: LiNbO$_3$) crystal may be formed at a position overlapping with the signal electrode. The thin-film optical waveguide is able to confine light at higher intensity than a diffused optical waveguide that diffuses metals, so that it is possible to improve efficiency in electric field application and it is possible to reduce driving voltage.

FIG. 20 is a schematic plan view illustrating an example of a configuration of an optical modulator 100 (LN modulator). The optical modulator 100 illustrated in FIG. 20 is connected to an optical fiber from a light source at an input side and is connected to an optical fiber for outputting a transmission signal at an output side. The optical modulator 100 includes an optical input unit 110, an RF modulation unit 120, and an optical output unit 130. The optical input unit 110 includes a first Si waveguide 111 and first LN-Si waveguide bonding units 112. The first Si waveguide 111 includes a single Si waveguide that is connected to the optical fiber at the input side, two Si waveguides that are branched from the single Si waveguide, four Si waveguides that are branched from the two Si waveguides, and eight Si waveguides that are branched from the four Si waveguide. The first LN-Si waveguide bonding units 112 bond the eight Si waveguides in the first Si waveguide 111 and eight LN waveguides in an LN waveguide 121 in the RF modulation unit 120.

The RF modulation unit 120 includes the LN waveguide 121, a signal electrode 122, and an RF terminator 123. The RF modulation unit 120, when light supplied from the first Si waveguide 111 propagates through the LN waveguide 121, modulates the light by using an electric field applied from the signal electrode 122. The LN waveguide 121 is, for example, an optical waveguide that is formed by using a thin-film LN substrate 154, and includes the eight parallel LN waveguides that are bonded to the respective first LN-Si waveguide bonding units 112 in the optical input unit 110. The light that propagates through and modulated in the LN waveguide 121 is output to the optical output unit 130.

The signal electrode 122 is an electrode that is arranged at a position overlapping with the LN waveguide 121 and that has a coplanar waveguide (CPW) structure, and applies an electric field to the LN waveguide 121 in accordance with an electrical signal that is output from the DSP and that has a bandwidth of dozens of GHz. A terminal end of the signal electrode 122 is connected to the RF terminator 123. The RF terminator 123 is connected to the terminal end of the signal electrode 122 and prevents unnecessary reflection of a signal that is transmitted by the signal electrode 122.

The optical output unit 130 includes a second LN-Si waveguide bonding unit 131, a second Si waveguide 132, eight child-side Mach-Zehnders (MZs) 133, and four parent-side MZs 134. Further, the optical output unit 130 includes a polarization rotator (PR) 135 and a polarization beam combiner (PBC) 136. The second LN-Si waveguide bonding unit 131 respectively bonds the eight LN waveguides in the LN waveguide 121 of the RF modulation unit 120 and eight Si waveguides in the second Si waveguides 132. The second Si waveguide 132 includes the eight Si waveguides that are connected to the second LN-Si waveguide bonding unit 131, and four Si waveguides, among the eight Si waveguides, that merge with two Si waveguides. Furthermore, the second Si waveguide 132 includes two Si waveguides, among the four Si waveguides, that merge with two Si waveguides, and a single Si waveguide that merges with the two Si waveguides and that is connected to the optical fiber at the output side.

The child-side MZs 133 are arranged for the respective eight Si waveguides in the second Si waveguide 132. A set of the child-side MZs 133 applies bias voltage to DC electrodes on the Si waveguides to adjust bias voltage such that ON/OFF of an electrical signal corresponds to ON/OFF of an optical signal, and outputs an I signal or a Q signal. The parent-side MZs 134 are arranged for the respective four Si waveguides in the second Si waveguide 132. A set of the parent-side MZs 134 applies bias voltage to the DC electrodes on the Si waveguides to adjust bias voltage such that ON/OFF of an electrical signal corresponds to ON/OFF of an optical signal, and outputs an I signal or a Q signal.

The PR 135 rotates the I signal or the Q signal that is input from one set of the parent-side MZs 134 by 90 degrees, and obtains a vertically-polarized optical signal that is rotated by 90 degrees. Then, the PR 135 inputs the vertically-polarized optical signal to the PBC 136. The PBC 136 couples the vertically-polarized optical signal input from the PR 135 and a horizontally-polarized optical signal input from the other set of the parent-side MZs 134, and outputs a dual-polarized signal.

FIG. 21 is a schematic cross-sectional view of an exemplary cross section of the optical modulator 100 taken along a line G-G in FIG. 20. The G-G cross-section illustrated in FIG. 20 is a cross-section of the first LN-Si waveguide bonding unit 112. The first LN-Si waveguide bonding unit 112 illustrated in FIG. 21 includes an Si substrate 151, a Box layer 152 that is laminated on the Si substrate 151 and that is made of silicon dioxide (SiO$_2$), and a first cladding layer 153 that is laminated on the Box layer 152 and that is made of SiO$_2$. Further, the first LN-Si waveguide bonding unit 112 includes the thin-film LN substrate 154 that is laminated on the first cladding layer 153 and a second cladding layer 155 that is laminated on the thin-film LN substrate 154 and that is made of SiO$_2$. The first Si waveguide 111 is formed in the center of the first cladding layer 153. The LN waveguide 121 that protrudes upward is formed in the center of the thin-film LN substrate 154. By arranging the first Si waveguide 111 and the LN waveguide 121 close to each other in a vertical direction, the first Si waveguide 111 and the LN waveguide 121 are directionally coupled.

FIG. 22 is a schematic cross-sectional view of an exemplary cross section of the optical modulator 100 taken along a line H-H in FIG. 20. The cross section taken along the line H-H in FIG. 20 is a cross-section of the RF modulation unit 120. The RF modulation unit 120 illustrated in FIG. 22 includes the Si substrate 151, the Box layer 152 that is laminated on the Si substrate 151 and that is made of SiO$_2$, and the first cladding layer 153 that is laminated on the Box layer 152. Further, the RF modulation unit 120 includes the thin-film LN substrate 154 that is laminated on the first cladding layer 153 and the second cladding layer 155 that is laminated on the thin-film LN substrate 154. The LN waveguide 121 that protrudes upward is formed in the center of the thin-film LN substrate 154. The signal electrode 122 having the CPW structure is arranged on a surface of the second cladding layer 155. In other words, the signal electrode 122 is arranged at a position overlapping with the LN waveguide 121, and a pair of ground electrodes 122A sandwiching the signal electrode 122 is arranged on the second cladding layer 155.

The LN waveguide 121 as described above is able to apply a high-frequency signal to the signal electrode 122 to generate an electric field and change a refractive index of the LN waveguide 121, and therefore is able to modulate light that propagates through the LN waveguide 121. Further, the thin-film LN substrate 154 and the LN waveguide 121 are laminated on the first cladding layer 153, so that it is possible to intensively confine light in the LN waveguide 121 and it is possible to reduce driving voltage applied to the signal electrode 122.

Patent Literature 1: U.S. Pat. No. 5,189,713
Patent Literature 2: International Publication Pamphlet No. WO2015/087988
Patent Literature 3: Japanese Laid-open Patent Publication No. 2003-195239
Patent Literature 4: U.S. Pat. No. 7,095,920
Non Patent Literature 1: Mingbo He et al., "High-performance hybrid silicon and lithium Niobate Mach-Zehender modulators for 100 Gbit/s and beyond" NATURE PHOTONICS vol.13, May 2019, 359-364

However, even in the optical modulator 100 that adopts an LN single crystal, it appears that further reduction in a device size and driving voltage is demanded.

SUMMARY

According to an aspect of an embodiment, an optical device includes a silicon substrate, a waveguide, a cladding layer, a ground electrode and a signal electrode. The waveguide is formed of a thin film that is laminated on the silicon substrate and that is made of a perovskite oxide with a large electro-optic effect as compared to lithium niobate. The cladding layer covers the waveguide. The ground electrode has a ground potential. The signal electrode is arranged at a position facing the ground electrode and applies driving voltage to the waveguide.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The present invention is not limited by the embodiments below. In addition, dimensions of various parts are illustrated by way of example for convenience of explanation, but the dimensions are not limited to this example and may be changed appropriately.

[a] First Embodiment

Figure 1:
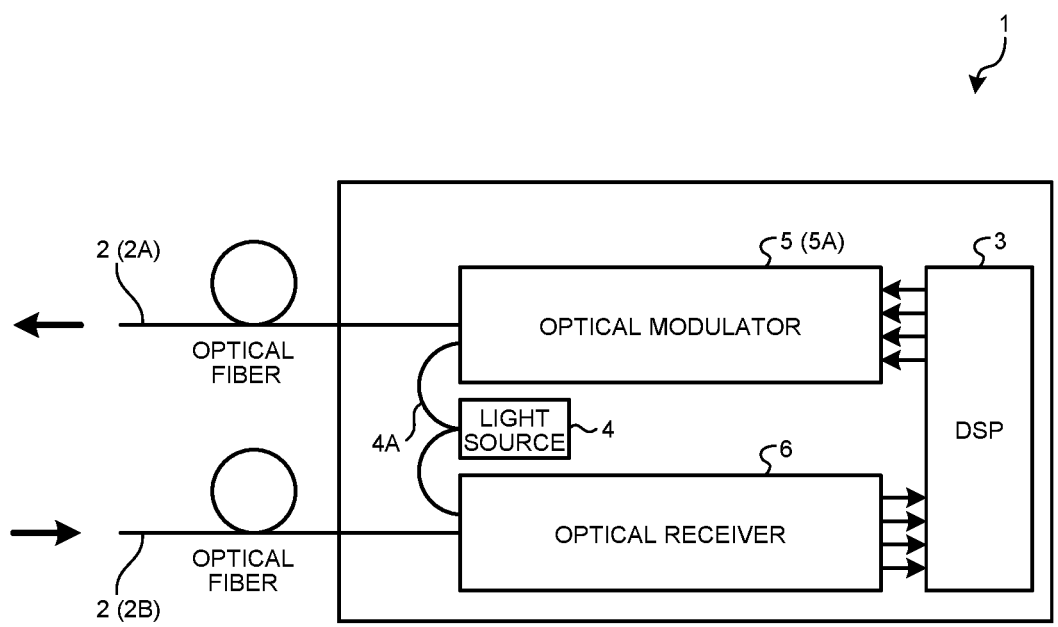
FIG. 1 is a block diagram illustrating an example of a configuration of an optical communication apparatus according to one embodiment.

FIG. 1 is a block diagram illustrating an example of a configuration of an optical communication apparatus 1 according to a first embodiment. The optical communication apparatus 1 illustrated in FIG. 1 is connected to an optical fiber 2A (2) at an output side and an optical fiber 2B (2) at an input side. The optical communication apparatus 1 includes a digital signal processor (DSP) 3, a light source 4, an optical modulator 5, and an optical receiver 6. The DSP 3 is an electrical component that performs digital signal processing. The DSP 3 performs a process, such as encoding, on transmission data, generates an electrical signal including the transmission data, and outputs the generated electrical signal to the optical modulator 5, for example. Further, the DSP 3 acquires an electrical signal including reception data from the optical receiver 6, performs a process, such as decoding, on the acquired electrical signal, and obtains reception data.

The light source 4 includes, for example, a laser diode or the like, generates light at a predetermined wavelength, and supplies the light to the optical modulator 5 and the optical receiver 6. The optical modulator 5 is an optical device that modulates the light supplied from the light source 4 by using the electrical signal output from the DSP 3, and outputs the obtained optical transmission signal to the optical fiber 2A.

The optical modulator 5 includes, for example, a lead zirconate titanate (PZT) waveguide 31 and a signal electrode 32 having a micro-stripline (MSL) structure. The optical modulator 5, when the light supplied from the light source 4 propagates through the PZT waveguide 31, modulates the light by the electrical signal input to the signal electrode 32, and generates an optical transmission signal.

The optical receiver 6 receives an optical signal from the optical fiber 2B and demodulates the received optical signal by using the light supplied from the light source 4. Then, the optical receiver 6 converts the demodulated received optical signal into an electrical signal, and outputs the converted electrical signal to the DSP 3.

Figure 2:
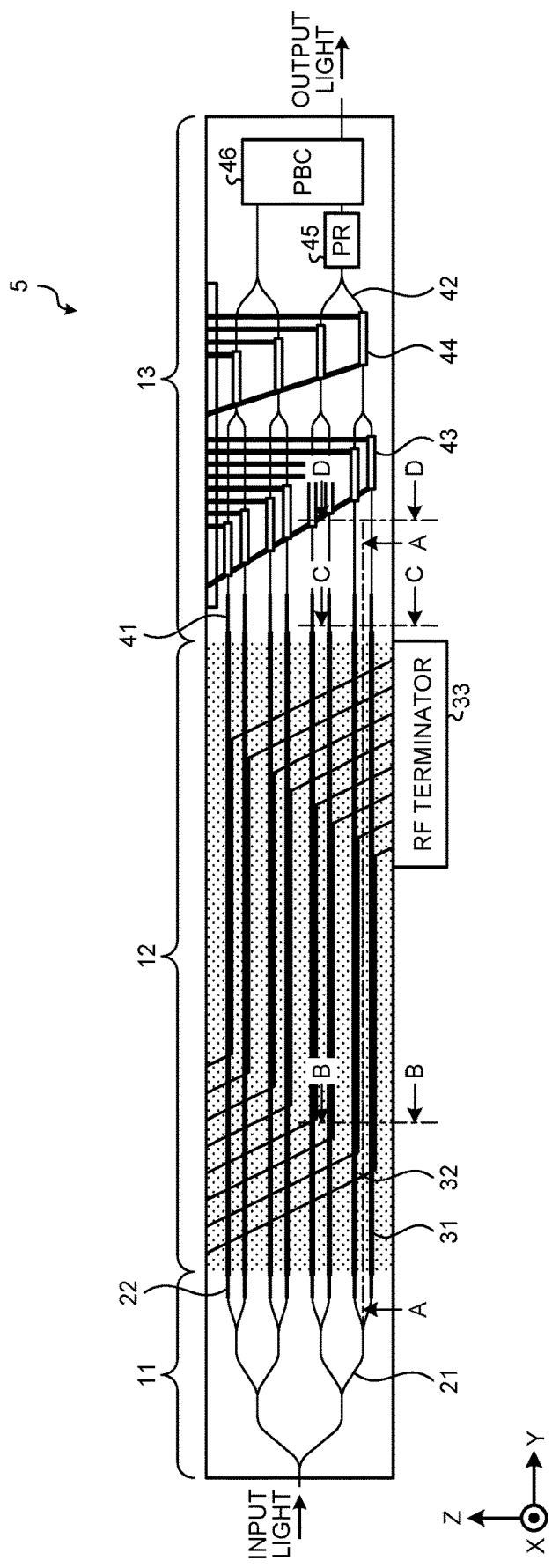
FIG. 2 is an exemplary schematic plan view illustrating a configuration of an optical modulator (PZT modulator) according to a first embodiment.

FIG. 2 is a schematic plan view illustrating an example of a configuration of the optical modulator (PZT modulator) 5 according to the first embodiment. The optical modulator 5 illustrated in FIG. 2 is, for example, a PZT modulator that is connected to an optical fiber 4A from the light source 4 at an input side and is connected to the optical fiber 2A for outputting a transmission signal at an output side. The optical modulator 5 includes a first optical input unit 11, an RF modulation unit 12, and a first optical output unit 13. The first optical input unit 11 includes a first Si waveguide 21 and first PZT-Si waveguide bonding units 22. The first Si waveguide 21 includes a single Si waveguide that is connected to the optical fiber 4A, two Si waveguides that are branched from the single Si waveguide, four Si waveguides that are branched from the two Si waveguides, and eight Si waveguides that are branched from the four Si waveguides. The first PZT-Si waveguide bonding units 22 bond the eight Si waveguides in the first Si waveguide 21 and eight PZT waveguides in the PZT waveguide 31.

The RF modulation unit 12 includes the PZT waveguide 31, the signal electrode 32, and an RF terminator 33. The RF modulation unit 12, when light supplied from the first Si waveguide 21 propagates through the PZT waveguide 31, modulates the light by using an electric field applied from the signal electrode 32. The PZT waveguide 31 is, for example, an optical waveguide that is formed by using a thin-film PZT substrate 55, is repeatedly branched from the input side, and includes the eight PZT waveguides that are parallel to one another. The light that propagates through and modulated in the PZT waveguide 31 is output to the first optical output unit 13. PZT is an inorganic material, such as a perovskite oxide, with a large electro-optic effect, such as an optical refractive index, as compared to LN.

The signal electrode 32 is a transmission path that is arranged at a position overlapping with the PZT waveguide 31 and that has the MSL structure, and applies an electric field to the PZT waveguide 31 in accordance with an electrical signal output from the DSP 3. A terminal end of the signal electrode 32 is connected to the RF terminator 33. The RF terminator 33 is connected to the terminal end of the signal electrode 32 and prevents unnecessary reflection of a signal that is transmitted by the signal electrode 32.

The thin-film PZT substrate 55 is a PZT single crystal, for which a crystal direction in which an electro-optic coefficient of the thin-film PZT substrate is high corresponds to a vertical direction (X direction) with respect to an Si substrate 51; therefore, the optical modulator 5 includes a ground electrode 53 between the Si substrate 51 and the signal electrode 32, and the electric field is oriented in the vertical direction (X direction) with respect to the Si substrate 51.

The first optical output unit 13 includes a second PZT-Si waveguide bonding unit 41, a second Si waveguide 42, eight child-side MZs 43, four parent-side MZs 44, a PR 45, and a PBC 46. The second PZT-Si waveguide bonding unit 41 bonds the PZT waveguide 31 in the RF modulation unit 12 and the second Si waveguide 42. The second Si waveguide 42 includes eight Si waveguides that are connected to the second PZT-Si waveguide bonding unit 41 and four Si waveguides, among the eight Si waveguides, that merge with two Si waveguides. Further, the second Si waveguide 42 includes two Si waveguides, among the four Si waveguides, that merge with two Si waveguides, and a single Si waveguide that merges with the two Si waveguides. The child-side Mach-Zehnders (MZs) 43 are arranged for the respective eight Si waveguides in the second Si waveguide 42. A set of the child-side MZs 43 applies bias voltage to DC electrodes on the Si waveguides to adjust bias voltage such that ON/OFF of an electrical signal corresponds to ON/OFF of an optical signal, and outputs an I signal that is an in-phase component or a Q signal that is a quadrature component. The parent-side MZs 44 are arranged for the respective four Si waveguides in the second Si waveguide 42. A set of the parent-side MZs 44 applies bias voltage to DC electrodes on the Si waveguides to adjust bias voltage such that ON/OFF of an electrical signal corresponds to ON/OFF of an optical signal, and outputs an I signal or a Q signal.

The PR 45 rotates the I signal or the Q signal that is input from one set of the parent-side MZs 44 by 90 degrees, and obtains a vertically-polarized optical signal that is rotated by 90 degrees. Then, the PR 45 inputs the vertically-polarized optical signal to the PBC 46. The PBC 46 couples the vertically-polarized optical signal input from the PR 45 and a horizontally-polarized optical signal input from the other set of the parent-side MZs 44, and outputs a dual-polarized signal.

Figure 3:
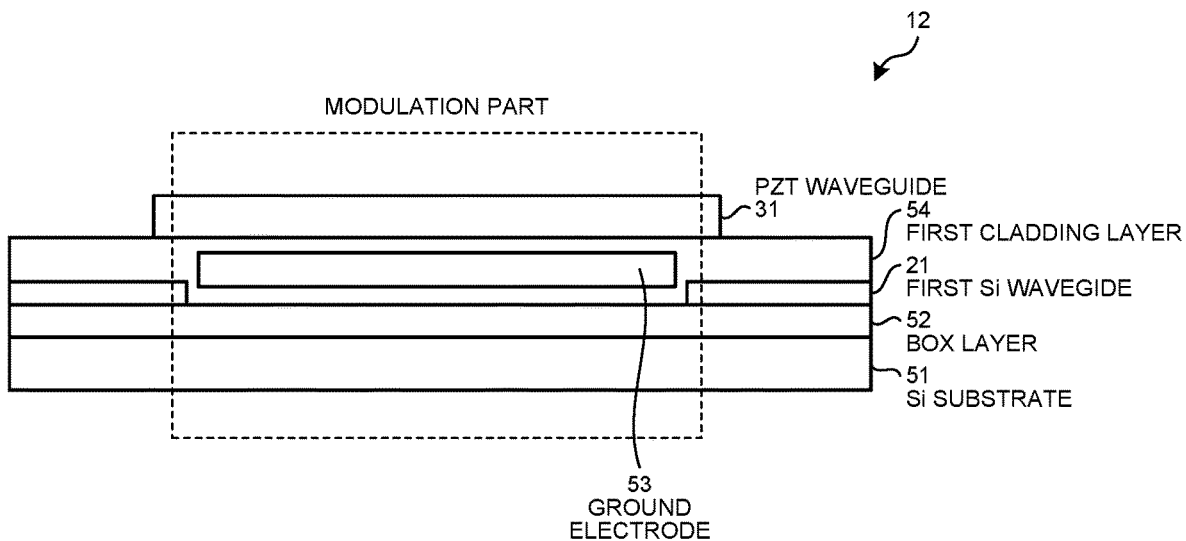
FIG. 3 is a schematic cross-sectional view of an exemplary cross section of the optical modulator taken along a line A-A in FIG. 2.
Figure 4:
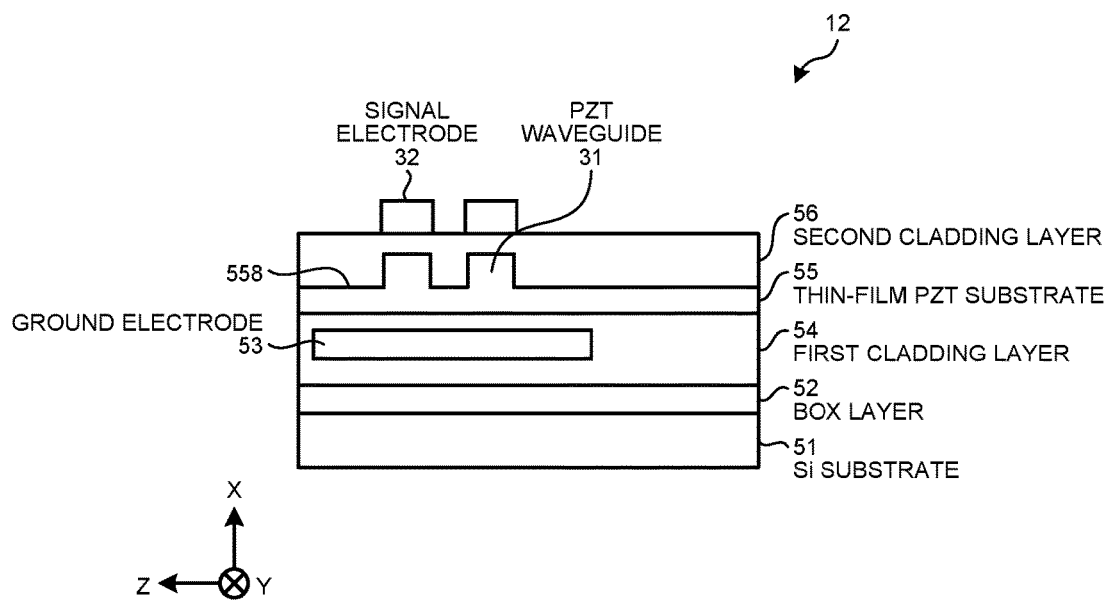
FIG. 4 is a schematic cross-sectional view of an exemplary cross section of the optical modulator taken along a line B-B in FIG. 2.

A configuration of the optical modulator 5 according to the first embodiment will be described in detail below. FIG. 3 is a schematic cross-sectional view of an exemplary cross section of the optical modulator 5 taken along a line A-A in FIG. 2, and FIG. 4 is a schematic cross-sectional view of an exemplary cross section of the optical modulator 5 taken along a line B-B in FIG. 2. The A-A cross section illustrated in FIG. 3 and the B-B cross section illustrated in FIG. 4 are cross-sections of the RF modulation unit 12. The RF modulation unit 12 includes the Si substrate 51, a Box layer 52 that is laminated on the Si substrate 51 and that is made of silicon dioxide ($SiO_2$) or the like, and the ground electrode 53 that is laminated on the Box layer 52 and that has the MSL structure. The RF modulation unit 12 includes the first Si waveguide 21 that is formed on the Box layer 52 and a first cladding layer 54 that is laminated on the ground electrode 53. Further, the RF modulation unit 12 includes the thin-film PZT substrate 55 that is laminated on the first cladding layer 54, a second cladding layer 56 that is laminated on the thin-film PZT substrate 55, and the signal electrode 32 that is laminated on the second cladding layer 56 and that has the MSL structure.

The Si substrate 51 is a Si substrate with a thickness of about several hundred μm, for example. The Box layer 52 is a substrate made of $SiO_2$, titanium dioxide ($TiO_2$), or the like, for example. The ground electrode 53 is an electrode that is made of metal, such as aluminum, that has a thickness of 0.1 μm or more, and that has a ground potential. The ground electrode 53 is able to reduce an influence of the electric field from the signal electrode 32 on the Si substrate 51 and reduce a high-frequency loss. The first cladding layer 54 is a layer that is made of $SiO_2$, $TiO_2$, or the like and that has a thickness of 0.3 to 0.5 nm, for example. Similarly, the second cladding layer 56 is a layer that is made of $SiO_2$, $TiO_2$, or the like and that has a thickness of 0.2 to 3 μm, for example. The second cladding layer 56 is able to prevent an optical loss caused by the signal electrode 32 that is arranged above the thin-film PZT substrate 55, for example.

The thin-film PZT substrate 55 with a thickness of 0.5 to 3 μm is sandwiched between the first cladding layer 54 and the second cladding layer 56, and the PZT waveguide 31 that protrudes upward is formed in the center of the thin-film PZT substrate 55, for example. A width of the protrusion that serves as the PZT waveguide 31 is, for example, about 1 to 8 μm. The thin-film PZT substrate 55 and the PZT waveguide 31 are covered by the second cladding layer 56, and the signal electrode 32 is arranged on a surface of the second cladding layer 56. In other words, the signal electrode 32 faces the ground electrode 53 across the PZT waveguide 31 and constitutes a transmission path of the MSL structure.

It is desirable to form a film of the ground electrode 53 of the MSL structure through Si wafer processing. Further, it is desirable to select a material by taking into account adhesiveness of the ground electrode 53 and the first cladding layer 54. Furthermore, it is desirable that the signal electrode 32 is made of a material for which a high-frequency loss is small and which is different from the material of the ground electrode 53.

The signal electrode 32 is an electrode that is made of a metal material, such as gold or copper, has a width of 2 to 10 μm, and has a thickness of 1 to 20 μm, for example. The ground electrode 53 is an electrode that is made of a metal material, such as aluminum, and has a thickness of 0.1 μm or more, for example. A high-frequency signal corresponding to an electrical signal output from the DSP 3 is transmitted by the signal electrode 32, so that an electric field in a direction from the signal electrode 32 to the ground electrode 53 is generated and the electric field is applied to the PZT waveguide 31. As a result, a refractive index of the PZT waveguide 31 is changed in accordance with the electric field applied to the PZT waveguide 31, so that it is possible to modulate light that propagates through the PZT waveguide 31. The thin-film PZT substrate 55 that forms the PZT waveguide 31 is a PZT single crystal, and therefore, a crystal direction (crystal orientation) is the vertical direction (X direction) with respect to the Si substrate 51, which is the same as a direction of the electric field.

The optical modulator 5 includes a Si optical integrated circuit wafer 500 and a thin-film PTZ substrate wafer 550. The Si optical integrated circuit wafer 500 is a wafer that forms the first optical input unit 11, the RF modulation unit 12, and the first optical output unit 13 in the optical modulator 5. The thin-film PTZ substrate wafer 550 is a wafer for forming the thin-film PZT substrate 55 that is a PZT single crystal and that forms the RF modulation unit 12.

Figure 5:
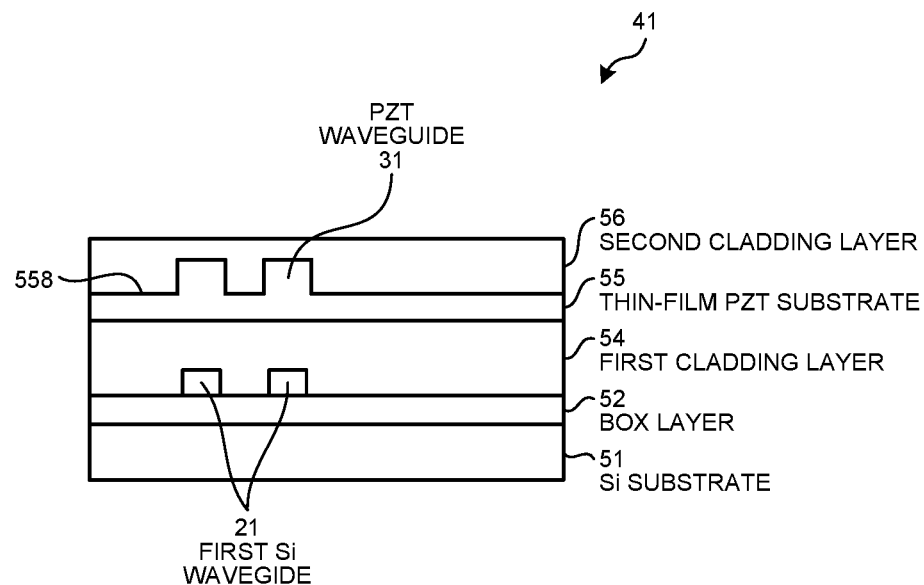
FIG. 5 is a schematic cross-sectional view of an exemplary cross section of the optical modulator taken along a line C-C in FIG. 2.

FIG. 5 is a schematic cross-sectional view of an exemplary cross section of the optical modulator 5 taken along a line C-C in FIG. 2. The C-C cross-section illustrated in FIG. 5 is a cross-section of the second PZT-Si waveguide bonding unit 41. The second PZT-Si waveguide bonding unit 41 includes the Si substrate 51, the Box layer 52 that is laminated on the Si substrate 51, the first Si waveguide 21 that is laminated on the Box layer 52, and the first cladding layer 54 that covers the first Si waveguide 21. Further, the second PZT-Si waveguide bonding unit 41 includes the thin-film PZT substrate 55 that includes the PZT waveguide 31 and that is laminated on the first cladding layer 54, and the second cladding layer 56 that is laminated on the thin-film PZT substrate 55.

Figure 6:
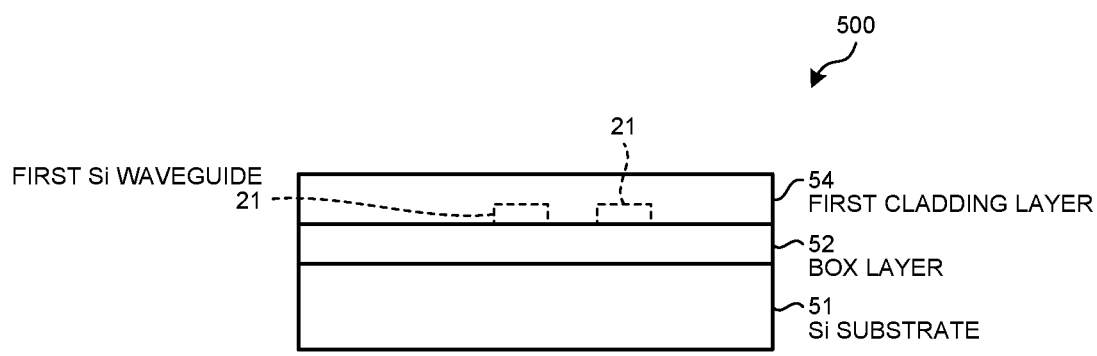
FIG. 6 is a schematic cross-sectional view of an exemplary cross section of the optical modulator (Si optical integrated circuit wafer) taken along a line D-D.

FIG. 6 is a schematic cross-sectional view of an exemplary cross section of the optical modulator 5 (the Si optical integrated circuit wafer 500) taken along a line D-D. The Si optical integrated circuit wafer 500 illustrated in FIG. 6 is constructed with a silicon on insulator (SOI) wafer. The Si optical integrated circuit wafer 500 includes the Si substrate 51, the Box layer 52 that is laminated on the Si substrate 51, the first Si waveguide 21 that is laminated on the Box layer 52, and the first cladding layer 54 that is laminated on the first Si waveguide 21. The first cladding layer 54 is a dielectric, such as a SiO$_2$ film, with a low refractive index, for example. A surface of the first cladding layer 54 is smoothed by chemical mechanical polishing (CMP) to reduce unevenness. Meanwhile, resin with a low refractive index may be adopted as a dielectric that covers the entire wafer surface, for example.

Figure 7:
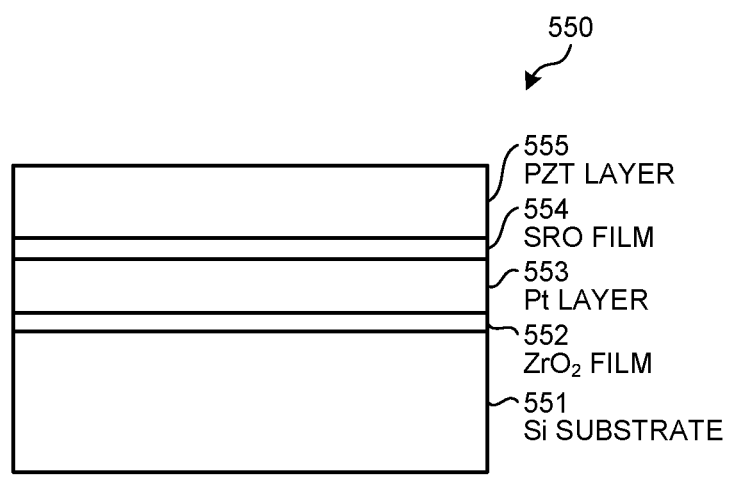
FIG. 7 is an exemplary schematic cross-sectional view of a thin-film PTZ substrate wafer.

FIG. 7 is an exemplary schematic cross-sectional view of the thin-film PTZ substrate wafer 550. The thin-film PTZ substrate wafer 550 illustrated in FIG. 7 includes a Si substrate 551, a ZrO$_2$ film 552, a Pt layer 553, an SRO film 554, and a PZT layer 555. The ZrO$_2$ film 552 is a film that includes a film portion of 10 nm or more and a protruding portion of 3 to 8 nm, and that is formed such that a first layer including ZrO$_2$ and having elasticity due to inclusion of crystal defects of up to 8% is formed on an Si single crystal by epitaxial growth, for example. The Pt layer 553 is a layer that is formed such that a second layer including Pt and having a film thickness of 20 nm or more is formed on the ZrO$_2$ film 552 by epitaxial growth, for example. The SRO film 554 is a film that is formed such that a third layer including strontium oxide (SRO) and having a film thickness of 20 nm or more is formed on the Pt layer 553 by epitaxial growth, for example. The PZT layer 555 is a layer that is formed such that a fourth layer including a thin film, such as PZT, with a piezoelectric effect and an electro-optic effect and having a film thickness of about 2 um is formed on the SRO film 554 by epitaxial growth, for example. The first layer, the second layer, the third layer, and the fourth layer are sequentially subjected to epitaxial growth, and the thin-film PTZ substrate wafer 550 that is a multi-layer film including the PZT layer 555 as a PZT single crystal is formed (reference: International Publication Pamphlet NO. WO2020/179210). As epitaxial growth, a vapor deposition method may be used for the ZrO$_2$ film 552, and a physical vapor deposition (PVD) method, such as sputtering, may be used for the Pt layer 553 and the SRO film 554. Further, it may be possible to heat the Si substrate 551 to 450 to 600° C. to promote epitaxial growth.

Here, the ZrO$_2$ crystal as the first layer is a tetragonal crystal, but has crystal defects of up to 8%, and, it is presumed that, if crystal defects are present, atoms located adjacent to defective vacancies have elasticity in a direction in which lattice distortion is reduced. With use of the elasticity of the ZrO$_2$ crystal, it is possible to implement a function that allows a change in a crystal structure. Further, formation the protruding portion made of the ZrO$_2$ crystal indicates that when a material density is supersaturated in a film formation process, crystal growth may occur such that a certain axis of the crystal grows in an anisotropic manner along a certain ridge while forming a pyramid structure.

Figure 8A:
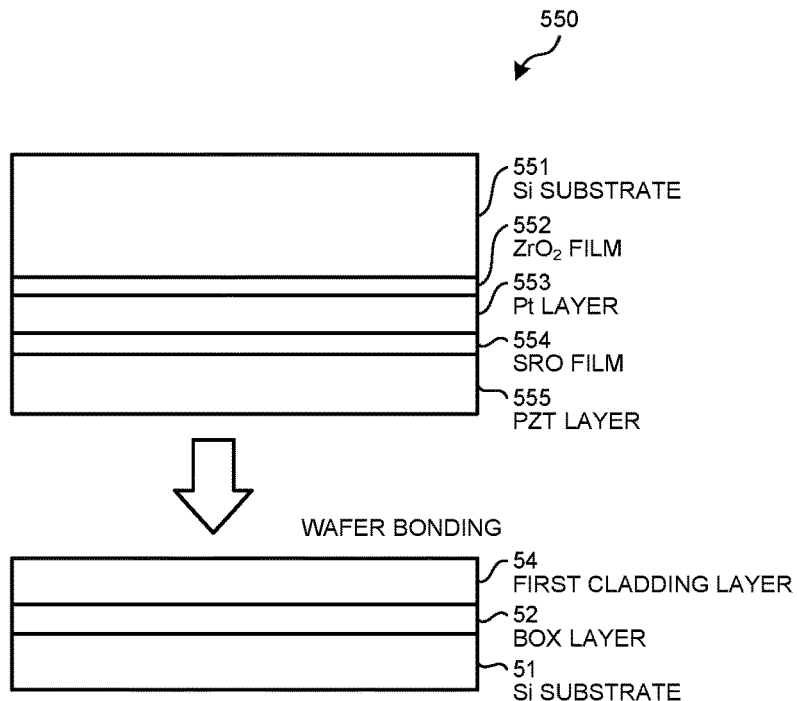
FIG. 8A is a diagram for explaining an exemplary process of manufacturing an RF modulation unit.
Figure 8B:
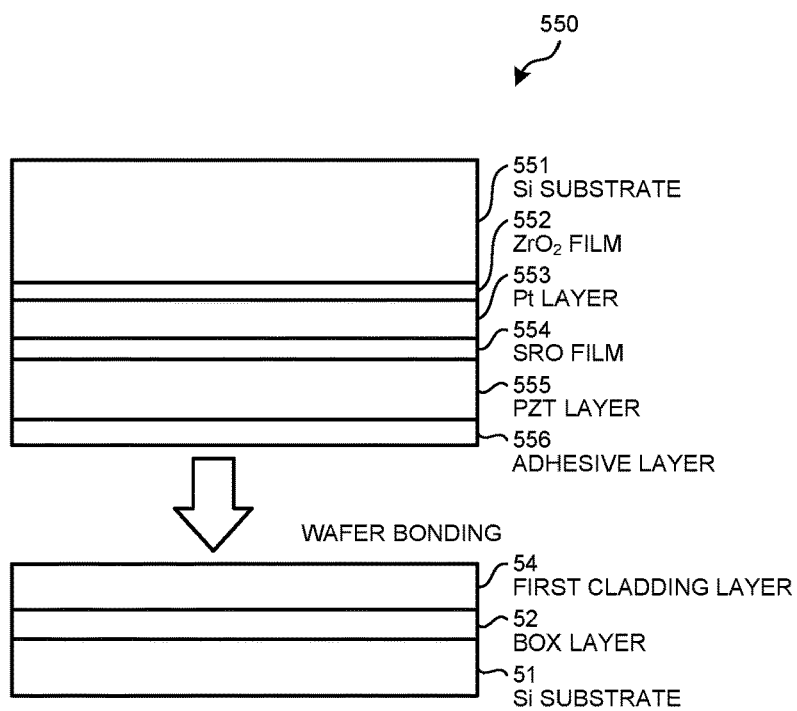
FIG. 8B is a diagram for explaining an exemplary process of manufacturing the RF modulation unit (adhesive layer)

FIG. 8A to FIG. 8E are diagrams for explaining an exemplary process of manufacturing the RF modulation unit 12 of the optical modulator 5. FIG. 8A is a diagram for explaining an exemplary process of manufacturing the RF modulation unit 12, and FIG. 8B is a diagram for explaining an exemplary process of manufacturing the RF modulation unit 12 (adhesive layer). The PZT layer 555 of the thin-film PTZ substrate wafer 550 illustrated in FIG. 8B is bonded, by wafer bonding, on the first cladding layer 54 in the Si optical integrated circuit wafer 500 via an adhesive layer 556.

Figure 8C:
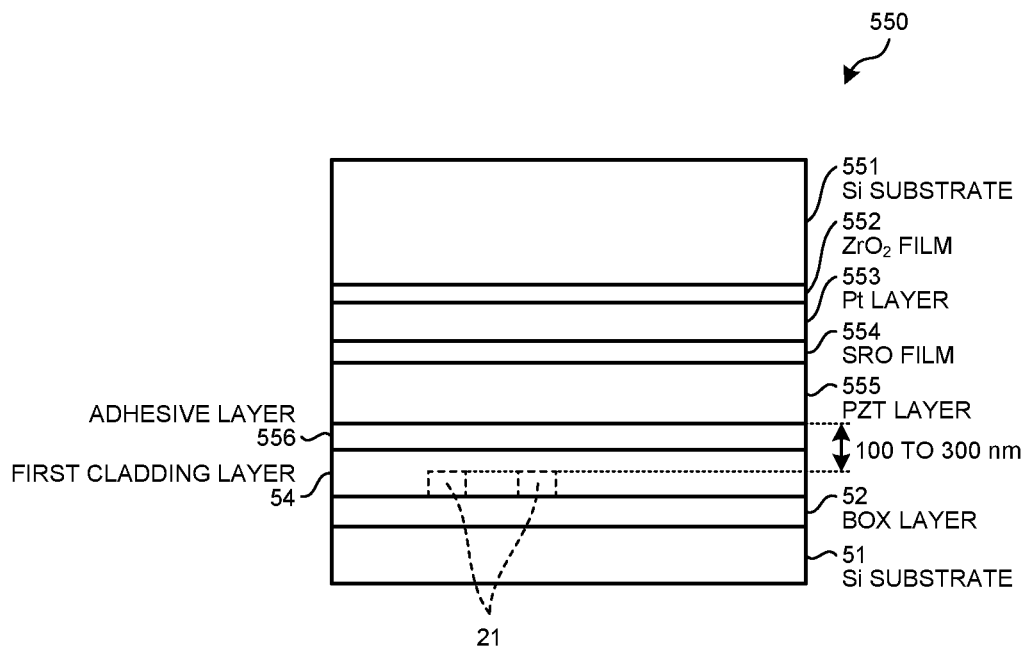
FIG. 8C is a diagram for explaining an exemplary process of manufacturing the RF modulation unit (adjustment of a dimension between a bottom surface of a PZT layer and an upper surface of an Si waveguide)

FIG. 8C is a diagram for explaining an exemplary process of manufacturing the RF modulation unit 12 (adjustment of a dimension between a bottom surface of the PZT layer 555 and an upper surface of the first Si waveguide 21). Meanwhile, for convenience of explanation, it is assumed that the first Si waveguide 21 has a thickness of, for example, 220 nm, and the PZT layer 555 has a thickness of, for example, 1 μm. The thin-film PTZ substrate wafer 550 is bonded, by wafer bonding, on the Si optical integrated circuit wafer 500. Further, thicknesses of the adhesive layer 556 and the first cladding layer 54 are adjusted such that a thickness dimension between the bottom surface of the PZT layer 555 illustrated in FIG. 8C and the upper surface of the first Si waveguide 21 falls within a range of 100 to 300 nm, for example. As a result, it is possible to achieve optical coupling from the first Si waveguide 21 to the PZT waveguide 31.

Figure 8D:
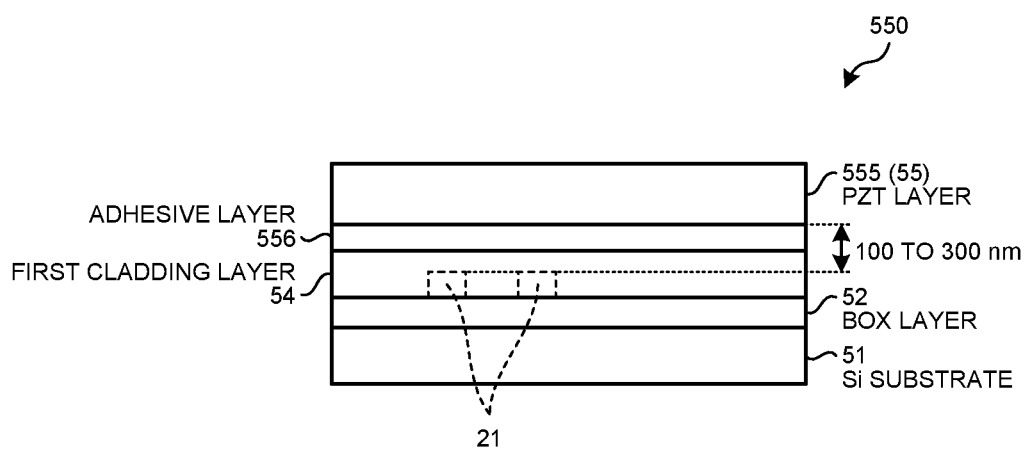
FIG. 8D is a diagram for explaining an exemplary process of manufacturing the RF modulation unit (polishing process)

FIG. 8D is a diagram for explaining an exemplary process of manufacturing the RF modulation unit 12 (polishing process). After the PZT layer 555 of the thin-film PTZ substrate wafer 550 is bonded on the Si optical integrated circuit wafer 500, the Si substrate 551, the ZrO$_2$ film 552, the Pt layer 553, and the SRO film 554 are removed by using the polishing process while remaining the PZT layer 555 in the thin-film PTZ substrate wafer 550.

Figure 8E:
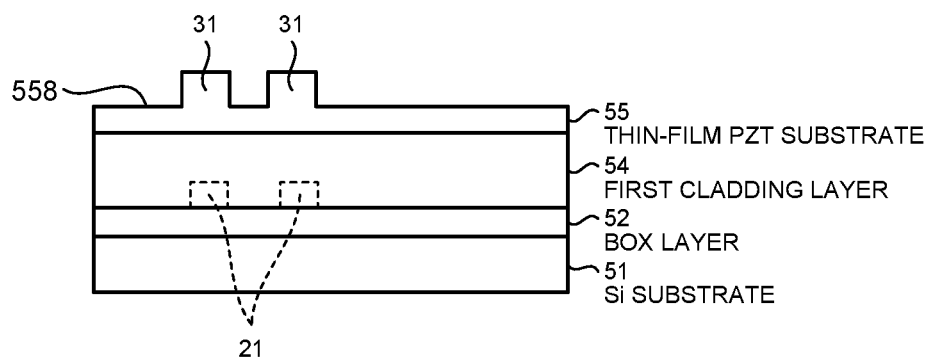
FIG. 8E is a diagram for explaining an exemplary process of manufacturing the RF modulation unit (formation of a thin-film PZT substrate)

FIG. 8E is a diagram for explaining an exemplary process of manufacturing the RF modulation unit 12 (formation of the thin-film PZT substrate). As illustrated in FIG. 8E, the PZT waveguides 31 in protruding shapes and a PZT slab 558 are further formed on a surface of the PZT layer 555 by using photolithography, on the PZT layer 555 of the thin-film PTZ substrate wafer 550 subjected to the polishing process. As a result, the thin-film PZT substrate 55 is formed on the first cladding layer 54. Meanwhile, the PZT slab 558 of the thin-film PZT substrate 55 is able to increase a bonding force between the first cladding layer 54 on the Si optical integrated circuit wafer 500 and the thin-film PZT substrate 55.

Then, the second cladding layer 56 is formed on the thin-film PZT substrate 55 (see FIG. 4). Further, the signal electrode 32 having the MSL structure is formed on the second cladding layer 56. As a result, the RF modulation unit 12 as illustrated in FIG. 4 is completed.

The optical modulator 5 of the first embodiment includes the Si substrate 51, the ground electrode 53 that is laminated on the Si substrate 51 and that has a ground potential, and the PZT waveguide 31 that is formed of the thin-film PZT substrate 55 laminated on the ground electrode 53. Further, the optical modulator 5 includes the signal electrode 32 that is arranged at a position facing the ground electrode 53 across the PZT waveguide 31 in the vertical direction of the Si substrate 51 and that applies a high-frequency signal to the PZT waveguide 31. As a result, with use of the PZT waveguide 31 that has a large electro-optic effect as compared to an LN waveguide, it is possible to improve modulation efficiency and it is possible to reduce a device size and driving voltage. With use of the thin-film PZT substrate 55, which is a PZT single crystal having a large electro-optic effect as compared to LN, as a material of the optical modulator 5, the PZT single crystal is able to achieve an electro-optic coefficient that is three times larger than that of an LN single crystal.

The optical modulator 5 includes the first cladding layer 54 that is laminated between the ground electrode 53 and the thin-film PZT substrate 55, and the second cladding layer 56 that is laminated on the thin-film PZT substrate 55 and that covers the PZT waveguide 31. The signal electrode 32 is arranged at a position overlapping with the PZT waveguides 31 on the surface of the second cladding layer 56. The signal electrode 32 generates an electric field inside the PZT waveguide 31 in the vertical direction (vertical direction (X direction) in FIG. 4) with respect to the Si substrate 51. The crystal direction of the PZT waveguide 31 is also the vertical direction (X direction) with respect to the Si substrate 51. In other words, the crystal direction of the PZT waveguide 31 is the same as the direction of the electric field, so that it is possible to improve efficiency in electric field application, reduce the driving voltage, and largely improves the modulation efficiency. Further, with use of PZT, it is possible to improve the modulation efficiency (voltage×electrode length). As a result, it is possible to reduce voltage and a device size. Furthermore, it is possible to achieve high modulation efficiency as compared to LN even if the electrode length is reduced, so that it is possible to further reduce the size of the optical modulator 5 in accordance with a reduced electrode length.

The optical modulator 5 includes the first cladding layer 54 that covers the first Si waveguide 21, and the second cladding layer 56 that covers the thin-film PZT substrate 55. A thickness of the first cladding layer 54 between the upper surface of the first Si waveguide 21 and the bottom surface of the thin-film PZT substrate 55 is set to 100 nm to 300 nm to achieve optical coupling between the first Si waveguide 21 and the PZT waveguide 31. As a result, it is possible to achieve optical coupling between the first Si waveguide 21 and the PZT waveguide 31.

The first cladding layer 54 is made of a dielectric or resin with a low refractive index. As a result, it is possible to bond the first cladding layer 54 and the thin-film PZT substrate 55.

The optical modulator 5 includes a dielectric 57 that is a $SiO_2$ film and that is a dielectric formed on a back surface of the Si substrate 51. As a result, it is possible to reduce an influence of warpage due to an influence of thermal history or the like in the process of manufacturing the optical modulator 5.

Figure 9:
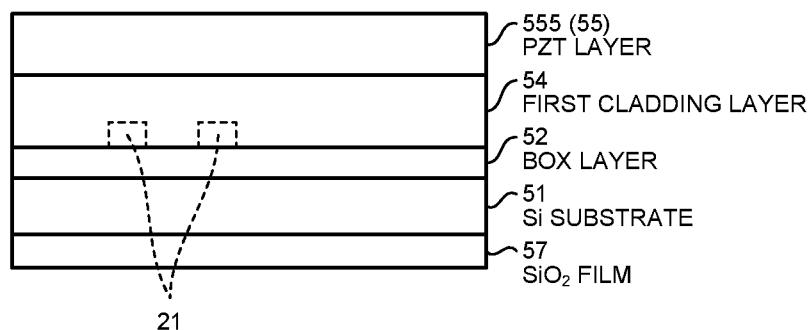
FIG. 9 is a diagram for explaining another example of the process of manufacturing the RF modulation unit.

Meanwhile, the case has been described in which the RF modulation unit 12 of the optical modulator 5 of the first embodiment is configured such that the PZT layer 555 is bonded on the Si optical integrated circuit wafer 500 via the adhesive layer 556 as illustrated in FIG. 8D. However, in the process of manufacturing the optical modulator 5, if warpage of the Si optical integrated circuit wafer 500 increases due to an influence of thermal history or the like, it may become difficult to adsorb the Si optical integrated circuit wafer 500 on a wafer stage by an exposure device or the like that is used to form a pattern of the optical modulator 5. Therefore, to cope with the situation as described above, as illustrated in FIG. 9, the dielectric 57, such as an $SiO_2$ film, is formed on the back surface of the Si substrate 51 of the Si optical integrated circuit wafer 500 to prevent warpage of the Si optical integrated circuit wafer 500. As a result, it is possible to avoid a situation in which the Si optical integrated circuit wafer 500 is not adsorbed on the wafer stage by the exposure device or the like that is used to form a pattern of the optical modulator 5.

Further, the case has been described in which the RF modulation unit 12 is configured such that the PZT layer 555 of the thin-film PTZ substrate wafer 550 is bonded on the first cladding layer 54 of the Si optical integrated circuit wafer 500 via an adhesive layer 556A. However, an appropriate change is applicable, and it may be possible to form a bonding portion between the first cladding layer 54 and the PZT layer 555 without using the adhesive layer 556A.

Figure 10:
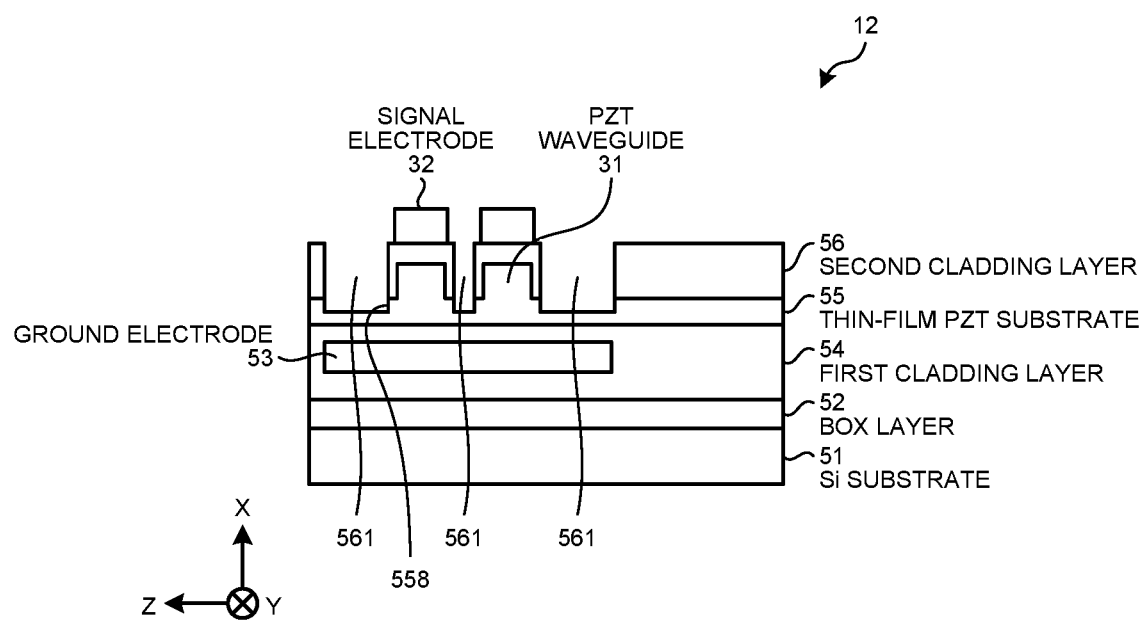
FIG. 10 is a schematic cross-sectional view illustrating a modification of the cross section of the optical modulator taken along the line B-B in FIG. 2.

FIG. 10 is a schematic cross-sectional view illustrating a modification of the cross section of the optical modulator 5 taken along the line B-B in FIG. 2. In the RF modulation unit 12 illustrated in FIG. 10, opening portions 561 are formed, through an etching process, in portions of the second cladding layer 56 that covers both sides of the PZT waveguides 31 of the thin-film PZT substrate 55. Further, in the RF modulation unit 12, the signal electrodes 32 are arranged on the second cladding layer 56 on the PZT waveguides 31. By opening the portions of the second cladding layer 56 that covers the both sides of the PZT waveguides 31, an influence of the second cladding layer 56 is reduced and electric fields that are generated in the vertical direction from the signal electrodes 32 to the ground electrode 53 is applied to the PZT waveguides 31. As a result, it is possible to improve the modulation efficiency.

Figure 11A:
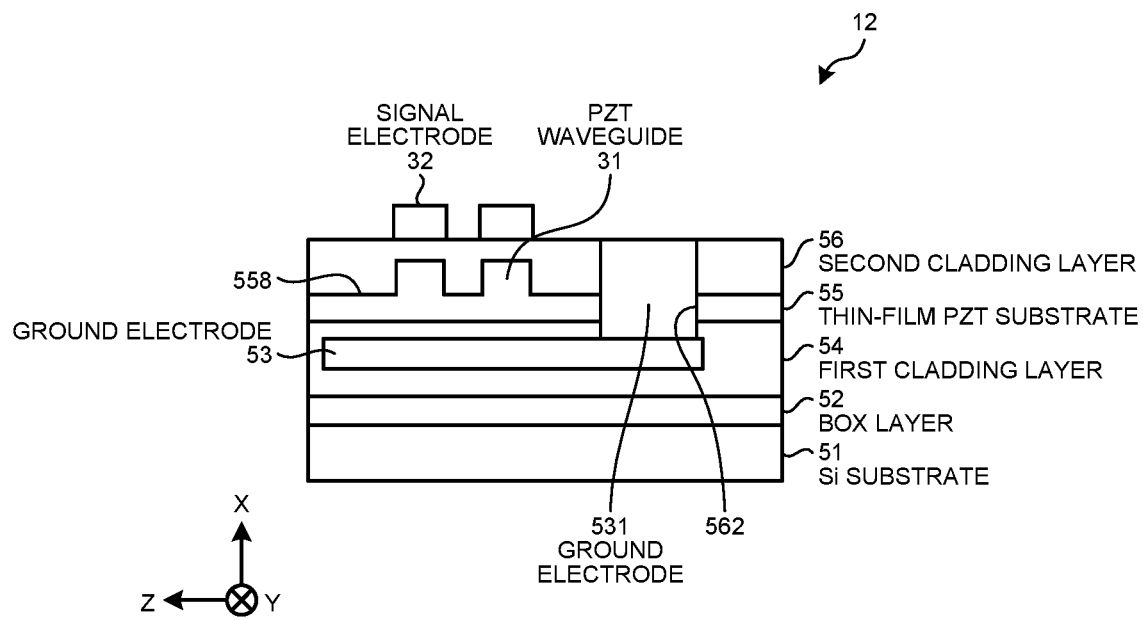
FIG. 11A is a schematic cross-sectional view illustrating a modification of the cross section of the optical modulator taken along the line B-B in FIG. 2.

FIG. 11A is a schematic cross-sectional view illustrating a modification of the cross section of the optical modulator 5 taken along the line B-B in FIG. 2. In the RF modulation unit 12 illustrated in FIG. 11A, an opening portion 562 that exposes a part of a surface of the ground electrode 53 covered by the first cladding layer 54 is formed by etching the second cladding layer 56, the thin-film PZT substrate 55, and the first cladding layer 54. Then, a metal film that is made of the same material as the ground electrode 53 is formed in the opening portion 562, and a ground electrode 531 for exposure is formed. As a result, the ground electrode 53 and the ground electrode 531 for exposure are electrically bonded, and it becomes possible to easily establish a ground connection by exposing the ground electrode 531 on the second cladding layer 56.

Meanwhile, for convenience of explanation, the case has been described in which, in the optical modulator 5 of the first embodiment, the first Si waveguide 21 and the PZT waveguide 31 are directionally coupled. However, an appropriate change is applicable, and the first Si waveguide 21 and the PZT waveguide may be butt-coupled.

It is necessary to provide the first cladding layer 54 between the thin-film PZT substrate 55 and the ground electrode 53, and increase a thickness of the first cladding layer 54 to laminate the ground electrode 53. Therefore, a distance between the PZT waveguide 31 and the first Si waveguide 21 is increased with an increase in the thickness of the first cladding layer 54, so that a bond length between the PZT waveguide 31 and the first Si waveguide 21 is increased. Therefore, to cope with the situation as described above, a Si-PZT waveguide may be provided between the PZT waveguide 31 and the first Si waveguide 21 to achieve optical coupling.

Figure 11B:
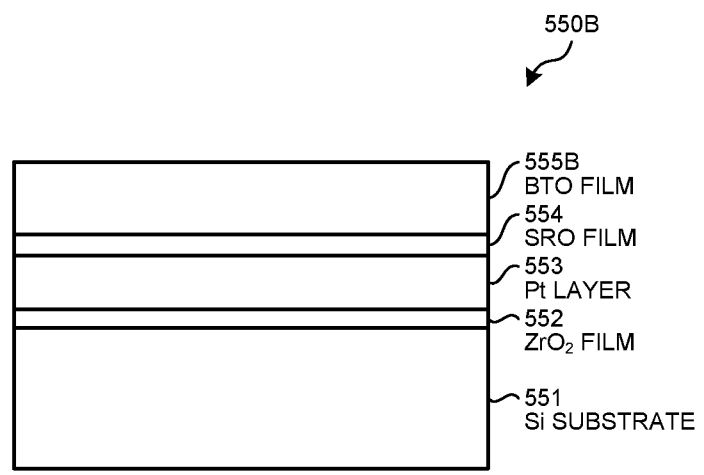
FIG. 11B is an exemplary schematic cross-sectional view of a thin-film BTO substrate wafer.

Meanwhile, while the PZT modulator is illustrated in the optical modulator 5 of the first embodiment, it may be possible to use a barium titanate ($BiTiO_3$: hereinafter, referred to as BTO) modulator in which BTO is adopted instead of PZT. FIG. 11B is an exemplary schematic cross-sectional view of a thin-film BTO substrate wafer 550B. The thin-film BTO substrate wafer 550B illustrated in FIG. 11B includes the Si substrate 551, the $ZrO_2$ film 552, the Pt layer 553, the SRO film 554, and a BTO film 555B. As described above, the $ZrO_2$ crystal as a tetragonal crystal has crystal defects and atoms located adjacent to defective vacancies have elasticity to implement a function to allow a change in a crystal structure, so that when a material density is supersaturated in a film formation process, crystal growth occurs such that a certain axis of the crystal grows in an anisotropic manner along a certain ridge while forming a pyramid structure: thus, epitaxial growth is possible even in BTO.

Further, in BTO, phase transition may occur at around 0° C. to 5° C. in an operation temperature range (for example, −5° C. to 75° C.) of the modulator: therefore, to stabilize properties in the operation temperature range, it may be possible to reduce the Curie temperature by doping BTO with Sr, Zr, La, KF, or the like to reduce phase transition temperature to −5° C. or less from around 0° C. to 5° C., or it may be possible to control the temperature at 25° C. to 45° C. by a Peltier device, for use of the BTO. Meanwhile, the Peltier device is mounted on a surface opposite to a surface on which the Si substrate 551 is laminated in FIG. 11B. Further, by controlling the temperature of the Peltier device at constant temperature, it is possible to stabilize the properties in the operation temperature range of the modulator.

Furthermore, the BTO film 555B of the thin-film BTO substrate wafer 550 is bonded, by wafer bonding, on the first cladding layer 54 in the Si optical integrated circuit wafer 500 via the adhesive layer 556. As a result, through the manufacturing process as illustrated in FIG. 8A to FIG. 8E, the thin-film BTO substrate instead of the thin-film PZT substrate 55 is formed on the first cladding layer 54. Meanwhile, a process of forming the thin-film BTO substrate is different in that the thin-film BTO substrate wafer 550 using the BTO film instead of the PZT film is used, but the other formation processes are substantially the same as the processes of forming the thin-film PZT substrate 55, and therefore, detailed explanation thereof will be omitted. Then, the second cladding layer 56 is formed on the thin-film BTO substrate (see FIG. 4). Moreover, the signal electrode 32 having the MSL structure is formed on the second cladding layer 56. As a result, the RF modulation unit with the BTO modulator is completed. A BTO waveguide formed in the thin-film BTO substrate has a certain shape that is similar to the PZT waveguides 31 formed on the thin-film PZT substrate 55 as illustrated in FIG. 8E.

Further, while the PZT modulator is described by way of example in the optical modulator 5 of the first embodiment, it may be possible to adopt a lanthanum-doped lead zirconate-lead titanate (PLZT) modulator in which PLZT is used instead of PZT, and an embodiment for this will be described below as a second embodiment. Meanwhile, the same components as those of the first embodiment are denoted by the same reference symbols, and repeated explanation of the configuration and the operation thereof will be omitted.

[b] Second Embodiment

Figure 12:
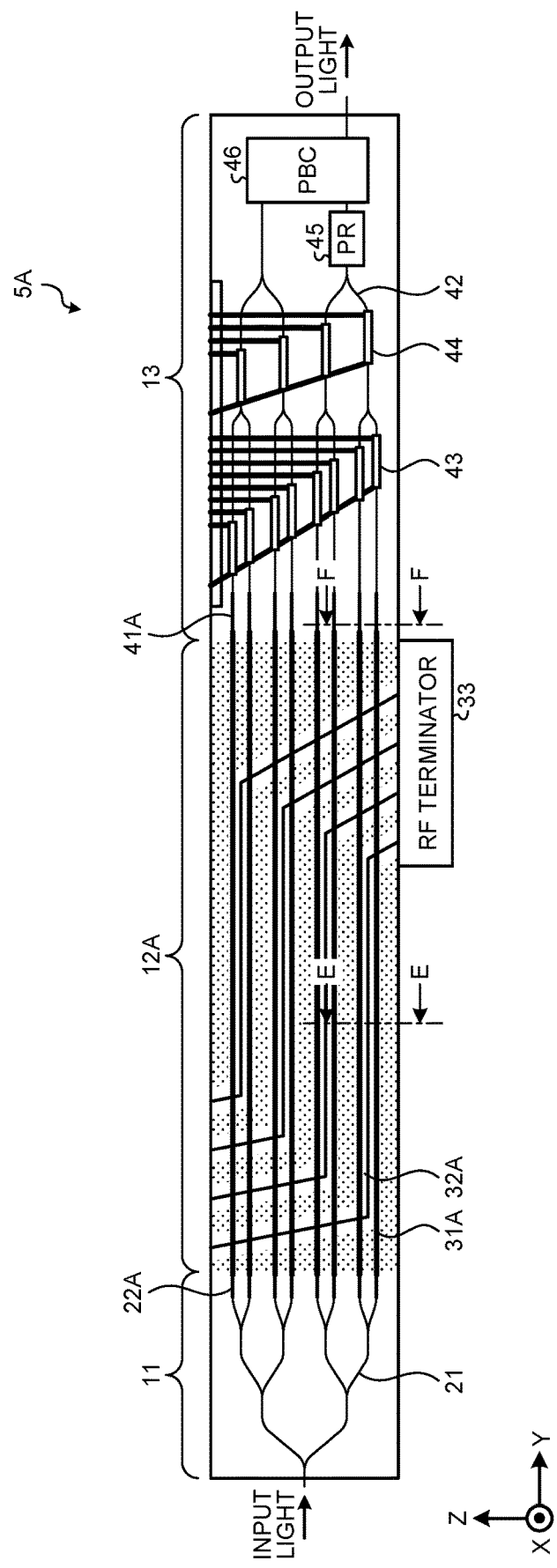
FIG. 12 is a schematic plan view illustrating an example of a configuration of an optical modulator (PLZT modulator) according to a second embodiment.

FIG. 12 is a schematic plan view illustrating an example of a configuration of an optical modulator (PLZT modulator) 5A according to the second embodiment. The optical modulator 5A illustrated in FIG. 12 is a PLZT modulator. The optical modulator 5A includes the first optical input unit 11, an RF modulation unit 12A, and the first optical output unit 13. The first optical input unit 11 includes the first Si waveguide 21 and a first PLZT-Si waveguide bonding unit 22A. The first Si waveguide 21 includes a single Si waveguide that is connected to the optical fiber 4A, two Si waveguides that are branched from the single Si waveguide, four Si waveguides that are branched from the two Si waveguides, and eight Si waveguides that are branched from the four Si waveguides. The first PLZT-Si waveguide bonding unit 22A bonds the eight Si waveguides in the first Si waveguide 21 and eight PLZT waveguides in a PLZT waveguide 31A.

The RF modulation unit 12A includes the PLZT waveguide 31A, a signal electrode 32A, and the RF terminator 33. The RF modulation unit 12A, when light supplied from the first Si waveguide 21 propagates through the PLZT waveguide 31A, modulates the light by using an electric field applied from the signal electrode 32A. The PLZT waveguide 31A is, for example, an optical waveguide that is formed by using a thin-film PLZT substrate 55A, is repeated branched from the input side, and includes eight PLZT waveguides that are parallel to one another. The light that propagates through and modulated in the PLZT waveguide 31A is output to the first optical output unit 13. PLZT is an inorganic material, such as a perovskite oxide, with a large electro-optic effect, such as an optical refractive index, as compared to LN.

The signal electrode 32A and a ground electrode 53A have coplanar waveguide (CPW) structures. The signal electrode 32A and a pair of ground electrodes 53A sandwiching the signal electrode 32A are arranged above the PLZT waveguide 31A. The signal electrode 32A applies an electric field to the PLZT waveguide 31A in accordance with an electrical signal output from the DSP 3. A terminal end of the signal electrode 32A is connected to the RF terminator 33.

Figure 13:
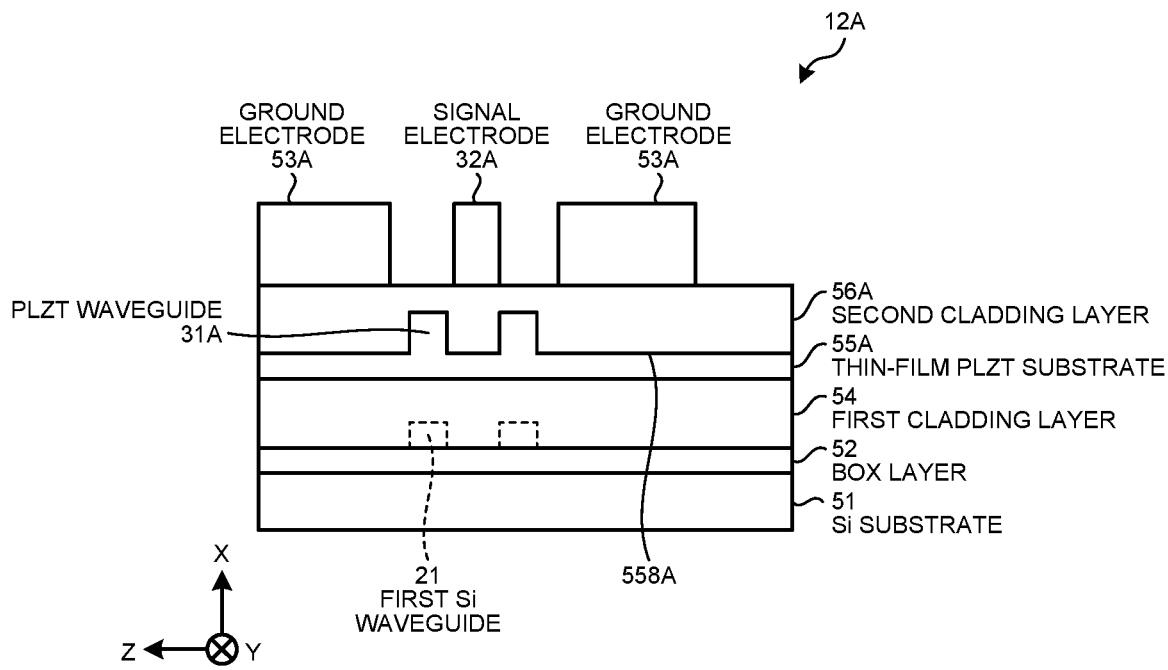
FIG. 13 is a schematic cross-sectional view of an exemplary cross section of the optical modulator taken along a line E-E in FIG. 12.

The optical modulator 5A includes the signal electrode 32A and the pair of ground electrodes 53A having the CPW structures above the PLZT waveguide 31A, and a direction of the electric field is a width direction with respect to the Si substrate 51 (left to right (Z direction) in FIG. 13). The thin-film PLZT substrate 55A is a PLZT single crystal, and a crystal direction of the thin-film PLZT substrate 55A is the width direction (Z direction) with respect to the Si substrate 51, which is the same as the direction of the electric field.

The first optical output unit 13 includes a second PLZT-Si waveguide bonding unit 41A, the second Si waveguide 42, the eight child-side MZs 43, the four parent-side MZs 44, the PR 45, and the PBC 46. The second PLZT-Si waveguide bonding unit 41A bonds the PLZT waveguide 31A in the RF modulation unit 12A and the second Si waveguide 42. The second Si waveguide 42 includes eight Si waveguides that are connected to the second PLZT-Si waveguide bonding unit 41A and four Si waveguides, among the eight Si waveguides, that merge with two Si waveguides.

A configuration of the optical modulator 5A according to the second embodiment will be described in detail below. FIG. 13 is a schematic cross-sectional view of an exemplary cross section of the optical modulator 5A taken along a line E-E in FIG. 12. The E-E cross-section illustrated in FIG. 13 is a cross-section of the RF modulation unit 12A. The RF modulation unit 12A includes the Si substrate 51, the Box layer 52 that is laminated on the Si substrate 51 and that is made of $SiO_2$, the first cladding layer 54 that is laminated on the Box layer 52. The RF modulation unit 12A includes the first cladding layer 54 that is laminated on the thin-film PLZT substrate 55A, the second cladding layer 56A that is laminated on the thin-film PLZT substrate 55A, and the signal electrode 32A and the pair of ground electrodes 53A that are laminated on a surface of a second cladding layer 56A and that have the CPW structures.

The Si substrate 51 is a Si substrate with a thickness of about several hundred μm, for example. The Box layer 52 is a substrate made of $SiO_2$, $TiO_2$, or the like, for example. The ground electrodes 53A are electrodes that are made of metal, such as copper, that have thicknesses of 1 μm or more, and that have ground potentials, for example. The first cladding layer 54 is a layer that is made of $SiO_2$, $TiO_2$, or the like, that has a high refractive index, and that has a thickness of 0.3 to 0.5 μm, for example. Similarly, the second cladding layer 56A is a layer that is made of $SiO_2$, $TiO_2$, or the like and that has a thickness of 0.2 to 3 μm, for example. The second cladding layer 56A is able to prevent an optical loss caused by the signal electrode 32A that is arranged above the thin-film PLZT substrate 55A, for example.

The thin-film PLZT substrate 55A with a thickness of 0.5 to 3 μm is sandwiched between the first cladding layer 54 and the second cladding layer 56A, and the PLZT waveguide 31A that protrudes upward is formed in the center of the thin-film PLZT substrate 55A, for example. A width of the protrusion that serves as the PLZT waveguide 31A is, for example, about 1 to 8 μm. The thin-film PLZT substrate 55A and the PLZT waveguide 31A are covered by the second cladding layer 56A, and the signal electrode 32A and the ground electrodes 53A are arranged on the surface of the second cladding layer 56A. In other words, the pair of ground electrodes 53A are arranged on the PLZT waveguides 31A, and the signal electrode 32A constitutes a transmission path of the CPW structure.

The signal electrode 32A is an electrode that is made of a metal material, such as gold or copper, has a width of 2 to 10 μm, and has a thickness of 1 to 20 μm, for example. The ground electrodes 53A are electrodes that are made of, for example, a metal material, such as gold or copper, and have thicknesses of 1 μm or more, for example. A high-frequency signal corresponding to an electrical signal output from the DSP 3 is transmitted by the signal electrode 32A, so that an electric field in a direction from the signal electrode 32A to the ground electrodes 53A is generated and the electric field is applied to the PLZT waveguide 31A. As a result, a refractive index of the PLZT waveguide 31A is changed in accordance with the electric field applied to the PLZT waveguide 31A, so that it is possible to modulate light that propagates through the PLZT waveguide 31A. Further, the thin-film PLZT substrate 55A that forms the PLZT waveguide 31A is a PLZT single crystal, and therefore, a crystal direction is also the width direction (Z direction). In other words, the crystal direction of the PLZT waveguide 31A is the same as the direction of the electric field, so that it is possible to improve efficiency in electric field application and reduce driving voltage. Further, it is possible to largely improve the modulation efficiency.

The optical modulator 5A includes the Si optical integrated circuit wafer 500 and a thin-film PLZT substrate wafer 550A. The thin-film PLZT substrate wafer 550A is a wafer for forming the thin-film PLZT substrate 55A that is a PLZT single crystal and that forms the RF modulation unit 12A.

Figure 14:
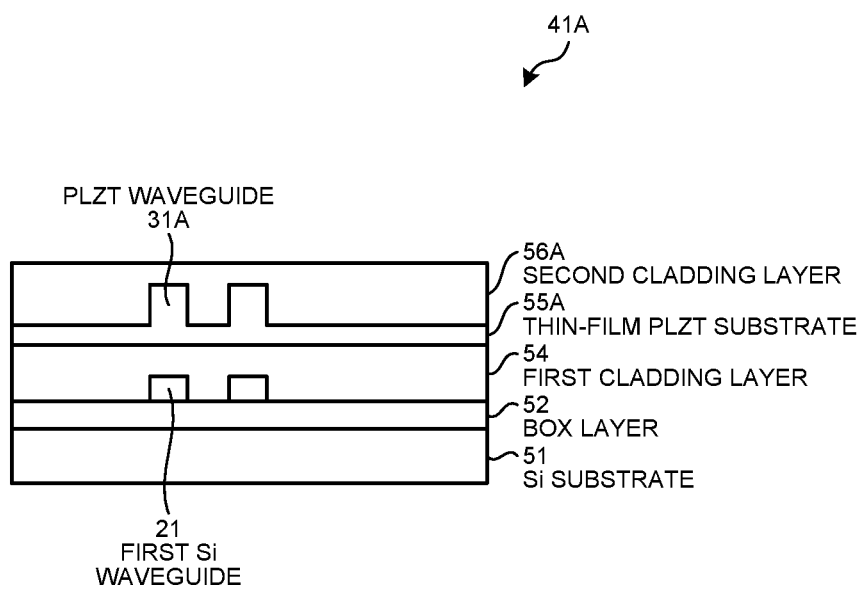
FIG. 14 is a schematic cross-sectional view of an exemplary cross section of the optical modulator taken along a line F-F in FIG. 12.

FIG. 14 is a schematic cross-sectional view of an exemplary cross section of the optical modulator 5A taken along a line F-F in FIG. 12. The F-F cross-section illustrated in FIG. 14 is a cross-section of the second PLZT-Si waveguide bonding unit 41A. The second PLZT-Si waveguide bonding unit 41A includes the Si substrate 51, the Box layer 52 that is laminated on the Si substrate 51, the first Si waveguide 21 that is laminated on the Box layer 52, and the first cladding layer 54 that covers the first Si waveguide 21. Further, the second PLZT-Si waveguide bonding unit 41A includes the thin-film PLZT substrate 55A that includes the PLZT waveguide 31A and that is laminated on the first cladding layer 54, and the second cladding layer 56A that is laminated on the thin-film PLZT substrate 55A.

Figure 15:
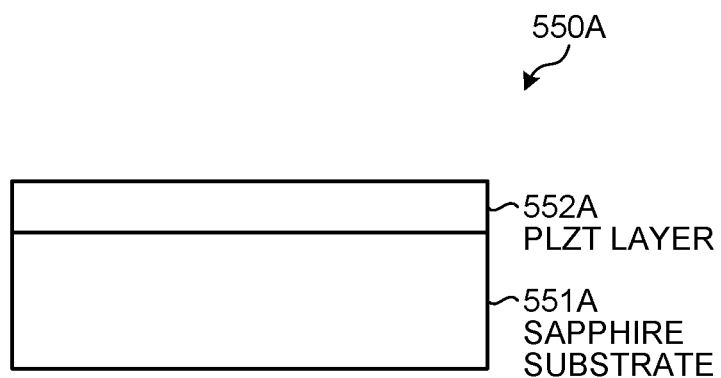
FIG. 15 is an exemplary schematic cross-sectional view of a thin-film PLZT substrate wafer.

FIG. 15 is an exemplary schematic cross-sectional view of the thin-film PLZT substrate wafer 550A. The thin-film PLZT substrate wafer 550A illustrated in FIG. 15 includes a sapphire substrate 551A and a PLZT layer 552A. The sapphire substrate 551A is a material with a certain lattice constant that is similar to that of PLZT.

An organometallic compound that is a reaction product of Pb, La, Zr, Ti and an organic compound is coated on the sapphire substrate 551A by a spin coating method or the like without hydrolysis (coating process). The sapphire substrate 551A that has been subjected to the coating process is thermally decomposed in an atmosphere containing oxygen, at temperature, such as 200° C. to 400° C., at which crystallization does not occur, and at a temperature rise rate of, for example, 1 to 100° C. per seconds, so that an amorphous thin film with a film thickness of, for example, 200 nm or less is formed (thermal decomposition process).

Subsequently, the temperature of the sapphire substrate 551A subjected to the thermal decomposition process is increased to crystal growth temperature of, for example, 600° C. to 800° C. in an atmosphere containing dry oxygen, and the sapphire substrate 551A is heated for, for example, 10 seconds to 12 hours. Then, a PLZT single crystal thin film is formed, by solid-phase epitaxy, on the sapphire substrate 551A (crystallization process). After the crystal growth, the temperature of, for example, 100° C. to 600° C. is maintained, and cooling is performed at a speed of, for example, 0.01° C. to 100° C. per second. By repeating a series of processes from the coating process to the crystallization process as described above for multiple times, it is possible to obtain the PLZT layer 552A with a desired film thickness of about 2 um, for example.

Meanwhile, a PLZT film as a first layer that is formed first on the sapphire ($Al_2O_3$) substrate 551A has a film thickness of 1 to 40 nm such that crystal grains of a PLZT film having a composition in which $0<x<0.30$ and $0<y<0.20$ when $Pb(1-x)La(x)(Zr(y)Ti(1-y))(1-x/4)O3$ are decomposed in an island-like manner. As a result, it is possible to easily perform epitaxial growth with a single-phase perovskite while avoiding a pyroclore layer. The second and subsequent layers on the first layer are formed by causing epitaxial growth to occur on a single-phase perovskite having a composition in which $0<x<0.20$ and $0.20<y<1.0$ when $Pb(1-x)La(x)(Zr(y)Ti(1-y))(1-x/4)O3$. As a result, even if the PLZT film of the first layer is decomposed in an island-like manner, it is possible to fill gaps without forming spaces between the islands, so that it is possible to smooth the surfaces of the PLZT films of the second and subsequent layers and prevent scattering. Meanwhile, from the necessity of preventing scattering at interfaces, refractive indices of the PLZT film of the first layer and the PLZT films of the second and subsequent layers are set such that a refractive index difference is, for example, 0.01 or less by appropriately adjusting amounts x and y.

Figure 16A:
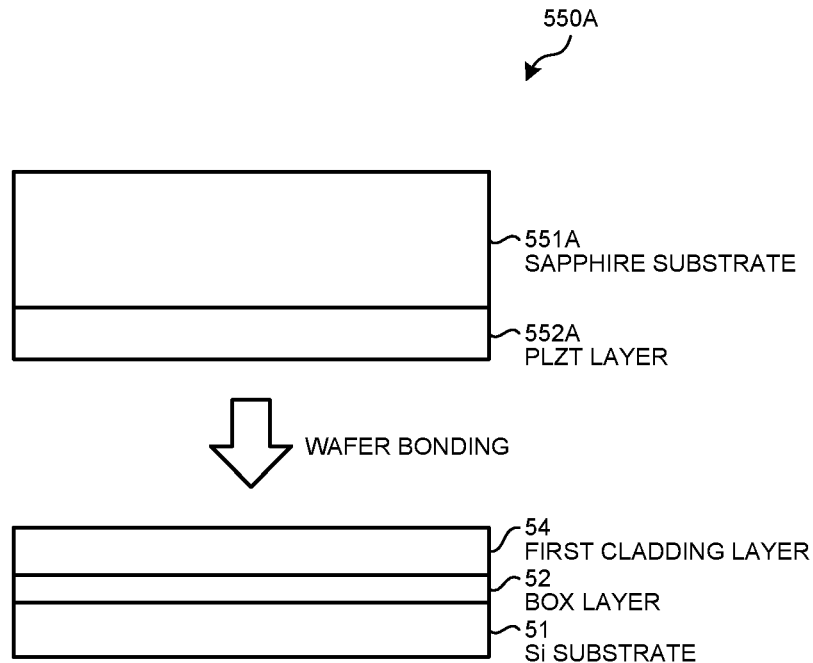
FIG. 16A is a diagram for explaining an exemplary process of manufacturing an RF modulation unit.
Figure 16B:
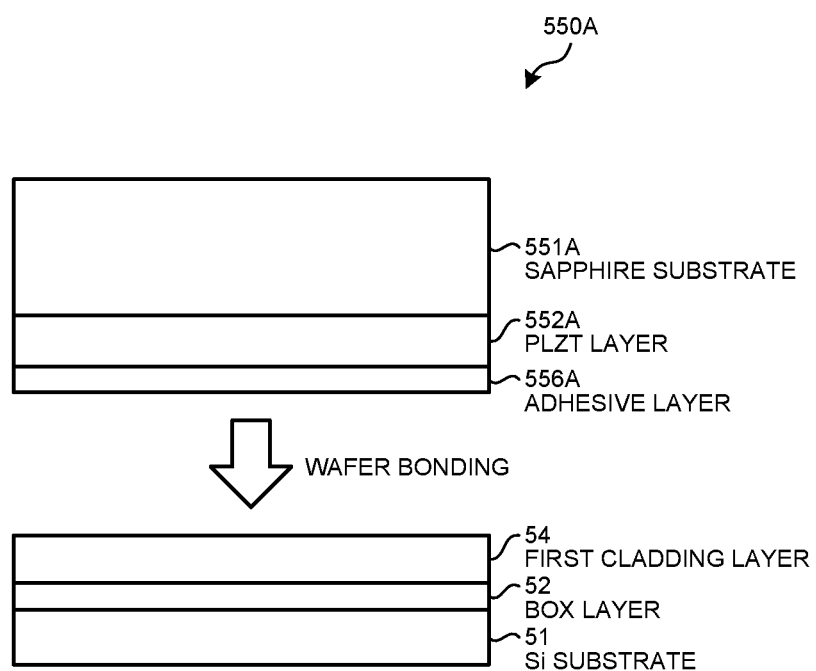
FIG. 16B is a diagram for explaining an exemplary process of manufacturing the RF modulation unit (adhesive layer)

FIG. 16A to FIG. 16E are diagrams for explaining an exemplary process of manufacturing the RF modulation unit 12A of the optical modulator 5A. FIG. 16A is a diagram for explaining an exemplary process of manufacturing the RF modulation unit, and FIG. 16B is a diagram for explaining an exemplary process of manufacturing the RF modulation unit (adhesive layer). In FIG. 16A and FIG. 16B, the adhesive layer 556A is laminated on the surface of the first cladding layer 54 of the Si optical integrated circuit wafer 500, and the PLZT layer 552A of the thin-film PLZT substrate wafer 550A is bonded on the adhesive layer 556A by wafer bonding.

Figure 16C:
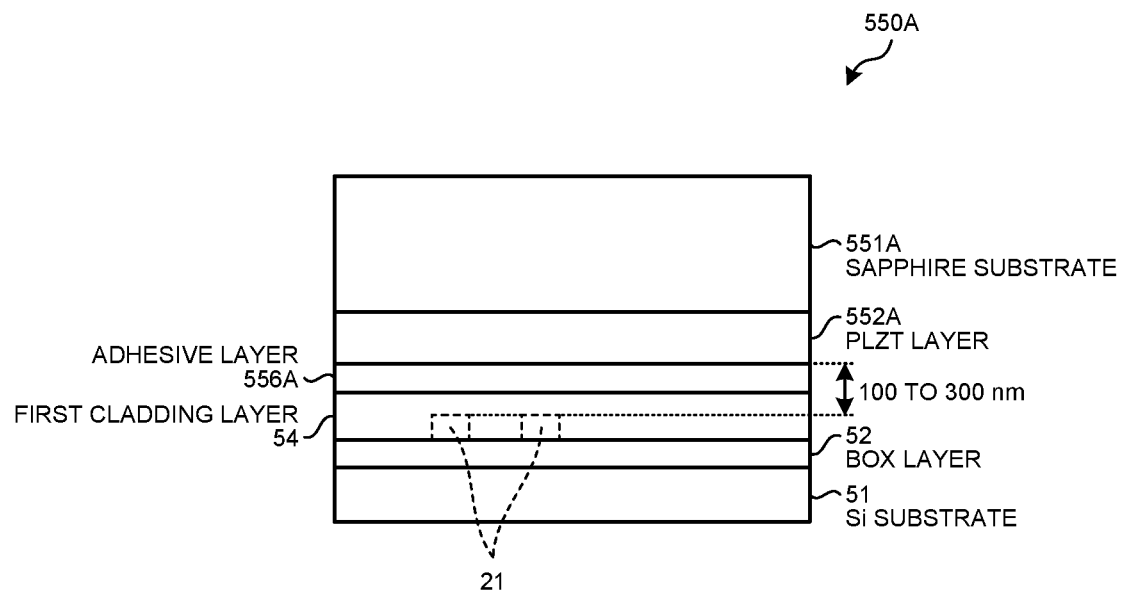
FIG. 16C is a diagram for explaining an exemplary process of manufacturing the RF modulation unit (adjustment of a dimension between a bottom surface of a PZT layer and an upper surface of an Si waveguide)

FIG. 16C is a diagram for explaining an exemplary process of manufacturing the RF modulation unit 12A (adjustment of a dimension between a bottom surface of the PLZT layer 552A and an upper surface of the first Si waveguide 21). Meanwhile, for convenience of explanation, it is assumed that the first Si waveguide 21 has a thickness of, for example, 220 nm, and the PLZT layer 552A has a thickness of, for example, 1 μm. A thickness dimension between the upper surface of the first Si waveguide 21 and the bottom surface of the PLZT layer 552A is, for example, 100 nm to 300 nm. Then, a thickness between the upper surface of the first Si waveguide 21 and the bottom surface of the PLZT layer 552A is set to, for example, 100 nm to 300 nm, so that it is possible to achieve optical coupling from the first Si waveguide 21 to the PLZT waveguide 31A.

Figure 16D:
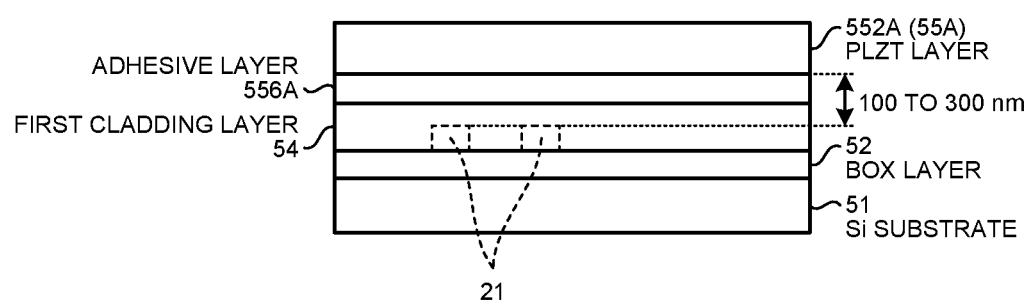
FIG. 16D is a diagram for explaining an exemplary process of manufacturing the RF modulation unit (polishing process)

FIG. 16D is a diagram for explaining an exemplary process of manufacturing the RF modulation unit 12A (polishing process). After the thin-film PLZT substrate wafer 550A is bonded on the first cladding layer 54 of the Si optical integrated circuit wafer 500 via the adhesive layer 556A, the sapphire substrate 551A is removed by using the polishing process while remaining the PLZT layer 552A in the thin-film PLZT substrate wafer 550A.

Figure 16E:
FIG. 16E is a diagram for explaining an exemplary process of manufacturing the RF modulation unit (formation of a thin-film PZT substrate)

FIG. 16E is a diagram for explaining an exemplary process of manufacturing the RF modulation unit 12A (formation of the thin-film PLZT substrate). The PLZT waveguides 31A in protruding shapes and a PLZT slab 558A are further formed on a surface of the PLZT layer 552A by using photolithography, on the PLZT layer 552A that forms the thin-film PLZT substrate 55A and that is subjected to the polishing process. Then, the thin-film PLZT substrate 55A is formed on the first cladding layer 54 of the Si optical integrated circuit wafer 500. Meanwhile, the PLZT slab 558A of the thin-film PLZT substrate 55A is able to increase a bonding force between the first cladding layer 54 on the Si optical integrated circuit wafer 500 and the thin-film PLZT substrate 55A.

Then, the second cladding layer 56A is laminated on the thin-film PLZT substrate 55A and the PLZT waveguides 31A. The RF modulation unit 12A forms the second cladding layer 56A that is laminated on the thin-film PLZT substrate 55A and forms the signal electrode 32 and the pair of ground electrodes 53A that are laminated on the second cladding layer 56A and that have the CPW structures. As a result, the RF modulation unit 12A is completed.

Figure 17:
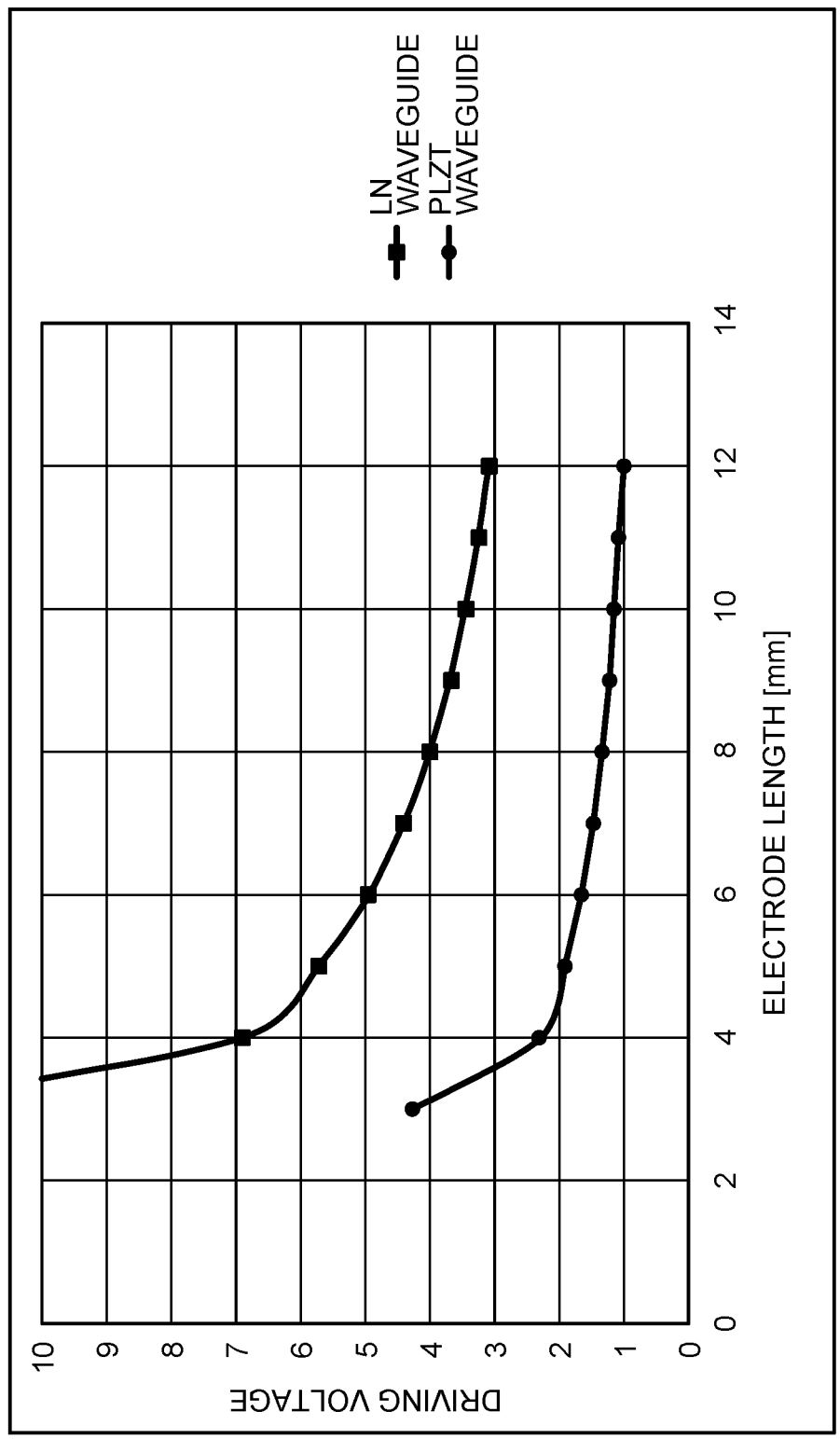
FIG. 17 is a diagram for explaining a result of comparison between an LN waveguide and a PLZT waveguide in relation to driving voltage with respect to an electrode length.
Figure 20:
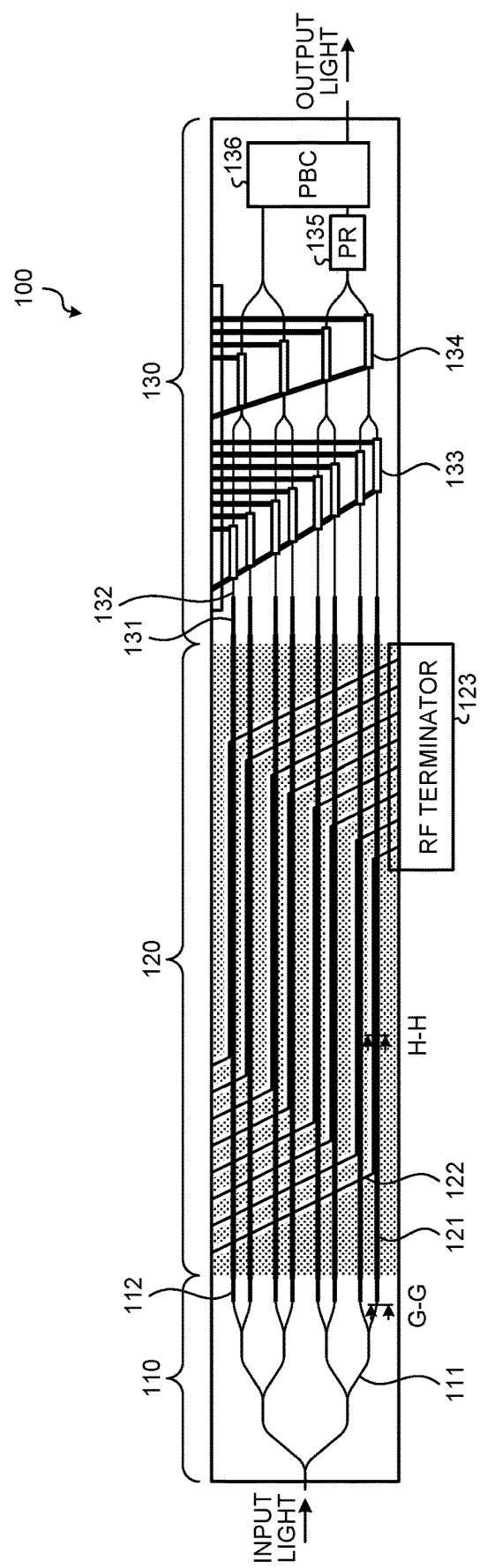
FIG. 20 is a schematic plan view illustrating an example of a configuration of an optical modulator (LN modulator)
Figure 21:
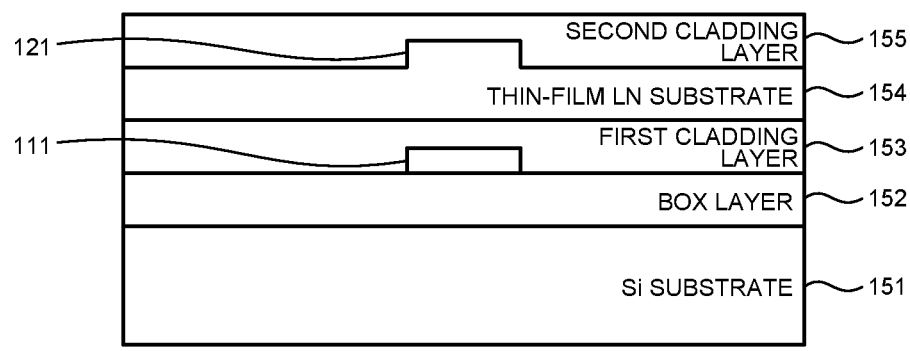
FIG. 21 is a schematic cross-sectional view of an exemplary cross section of the optical modulator taken along a line G-G in FIG. 20.
Figure 22:
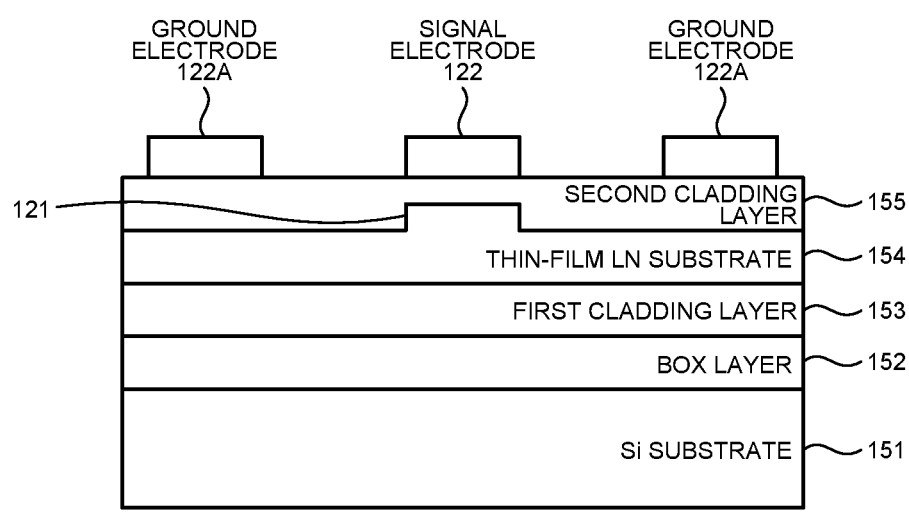
FIG. 22 is a schematic cross-sectional view of an exemplary cross section of the optical modulator taken along a line H-H in FIG. 20.

FIG. 17 is a diagram for explaining a result of comparison between the LN waveguide 121 and the PLZT waveguide 31A in relation to driving voltage with respect to the electrode length. In FIG. 17, a vertical axis represents the driving voltage and a horizontal axis represents the electrode length. The electrode length is a length of the signal electrode. The LN waveguide 121 is a waveguide of the RF modulation unit 120 illustrated in FIG. 20. The PLZT waveguide 31A is a waveguide of the RF modulation unit 12A illustrated in FIG. 12. To ensure the same refractive index, if the electrode length of the signal electrode 32A of the PLZT waveguide 31A is 12 mm, a driving voltage of "1" is needed, but is the electrode length of the signal electrode 122 of the LN waveguide 121 is 12 mm, a driving voltage of "3" is needed. Therefore, the PLZT waveguide 31A has an electro-optic effect that is three times larger than that of the LN waveguide 121.

The optical modulator 5A according to the second embodiment includes the Si substrate 51 and the PLZT waveguide 31A that is formed by the thin-film PLZT substrate 55A laminated on the Si substrate 51. Further, the optical modulator 5A includes the second cladding layer 56A that is laminated on the PLZT waveguide 31A, and includes the signal electrode 32A and the ground electrodes 53A that are formed on the second cladding layer 56A and that have the CWP structures. As a result, with use of the PLZT waveguide 31A that has a large electro-optic effect as compared to an LN waveguide, it is possible to improve modulation efficiency and it is possible to reduce a device size and driving voltage. With use of the thin-film PLZT substrate 55A, which is a PLZT single crystal having a large electro-optic effect as compared to LN, as a material of the optical modulator 5A, the PLZT single crystal is able to achieve an electro-optic coefficient that is three times larger than that of an LN single crystal.

The optical modulator 5A includes the thin-film PLZT substrate 55A, the second cladding layer 56A that is laminated on the thin-film PLZT substrate 55A and that covers the PLZT waveguide 31A, and the signal electrode 32A and the ground electrode 53A that are formed on the second cladding layer 56A and that have the CWP structures. The signal electrode 32A generates an electric field in the PLZT waveguide 31A in the width direction (Z direction) of the Si substrate 51. The crystal direction of the PLZT waveguide 31A is the width direction (Z direction). In other words, the crystal direction of the PLZT waveguide 31A is the same as the direction of the electric field, so that it is possible to improve efficiency in electric field application, reduce the driving voltage, and largely improves the modulation efficiency. Further, with use of PLZT, it is possible to improve the modulation efficiency (voltage×electrode length). As a result, it is possible to reduce voltage and a device size. Furthermore, it is possible to achieve high modulation efficiency as compared to LN even if the electrode length is reduced, so that it is possible to further reduce the size of the optical modulator 5A in accordance with a reduced electrode length.

The optical modulator 5A includes the first cladding layer 54 that covers the first Si waveguide 21 and the second cladding layer 56A that covers the thin-film PLZT substrate 55A. A thickness of the first cladding layer 54 between the upper surface of the first Si waveguide 21 and the bottom surface of the thin-film PLZT substrate 55A is set to 100 nm to 300 nm to achieve optical coupling between the first Si waveguide 21 and the PLZT waveguide 31A. As a result, it is possible to achieve optical coupling between the first Si waveguide 21 and the PLZT waveguide 31A.

The first cladding layer 54 is made of a dielectric or resin with a low refractive index. As a result, it is possible to bond the first cladding layer 54 and the thin-film PLZT substrate 55A.

The optical modulator 5A includes a dielectric 57A that is a SiO$_2$ layer and that is a dielectric formed on the back surface of the Si substrate 51. As a result, it is possible to reduce an influence of warpage due to an influence of thermal history or the like in the process of manufacturing the optical modulator 5A.

Figure 18:
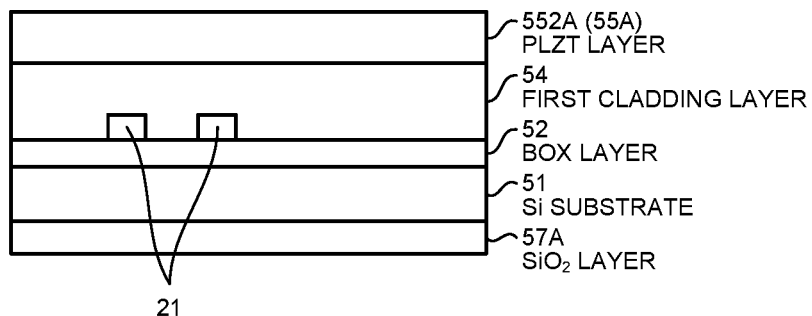
FIG. 18 is a diagram for explaining another example of the process of manufacturing the RF modulation unit.

Meanwhile, the case has been described in which the RF modulation unit 12A of the optical modulator 5A of the second embodiment is configured such that the PLZT layer 552A is bonded on the Si optical integrated circuit wafer 500 via the adhesive layer 556A as illustrated in FIG. 16D. However, in the process of manufacturing the optical modulator 5A, if warpage of the Si optical integrated circuit wafer 500 increases due to an influence of thermal history or the like, it may become difficult to adsorb the Si optical integrated circuit wafer 500 on a wafer stage by an exposure device or the like that is used to form a pattern of the optical modulator 5A. Therefore, to cope with the situation as described above, as illustrated in FIG. 18, the dielectric 57A, such as an SiO$_2$ film, is formed on the back surface of the Si substrate 51 of the Si optical integrated circuit wafer 500 to prevent warpage of the Si optical integrated circuit wafer 500. As a result, it is possible to avoid a situation in which the Si optical integrated circuit wafer 500 is not adsorbed on the wafer stage by the exposure device or the like that is used to form a pattern of the optical modulator 5A.

Further, the case has been described in which the RF modulation unit 12A is configured such that the PLZT layer 552A of the thin-film PLZT substrate wafer 550A is bonded on the first cladding layer 54 of the Si optical integrated circuit wafer 500 via the adhesive layer 556A. However, an appropriate change is applicable, and it may be possible to form a bonding portion between the first cladding layer 54 and the PLZT layer 552A without using the adhesive layer 556A.

The case has been described in which the RF modulation unit 12A illustrated in FIG. 13 has a CPW electrode structure in which the signal electrode 32A is arranged between the pair of ground electrodes 53A on the first cladding layer 54, but the structure is not limited to the electrode structure as illustrated in FIG. 13, and an appropriate change is applicable.

Figure 19:
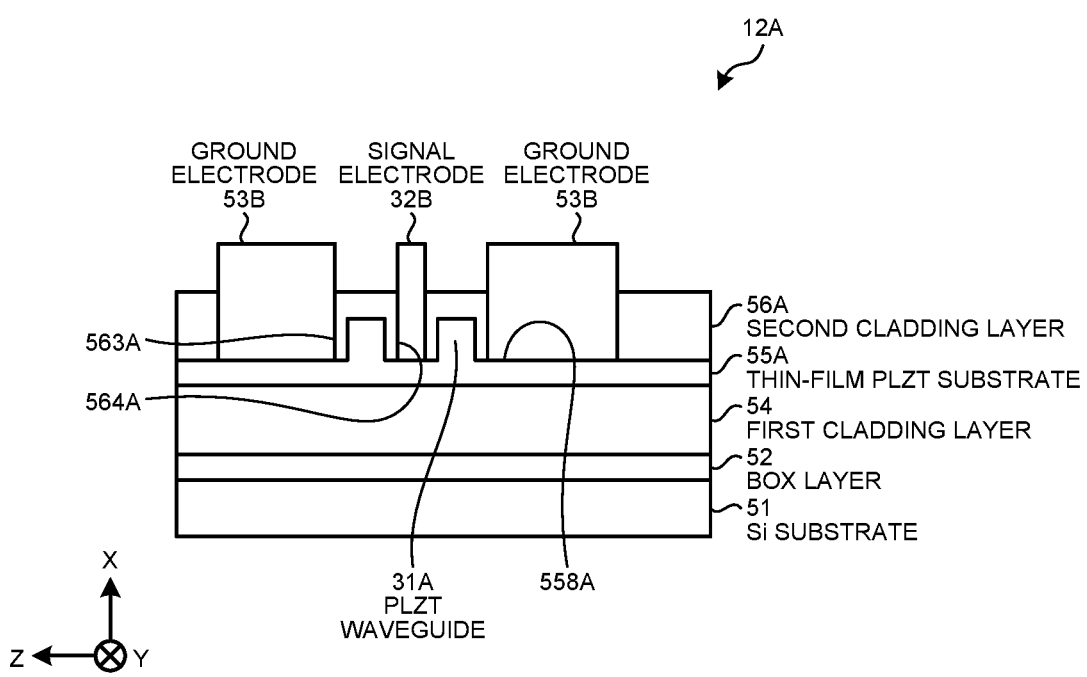
FIG. 19 is a schematic cross-sectional view illustrating a modification of the cross section of the optical modulator taken along the line E-E

FIG. 19 is a schematic cross-sectional view illustrating a modification of the cross section of the optical modulator 5A taken along the line E-E in FIG. 2. In the RF modulation unit 12A illustrated in FIG. 19, the second cladding layer 56A is partly etched on both sides of the PLZT waveguides 31A of the thin-film PLZT substrate 55A are etched. Further, an opening portion 563A and an opening portion 564A for exposing parts of a surface of the PLZT slab 558A of the thin-film PLZT substrate 55A are formed on the second cladding layer 56A. Then, ground electrodes 53B are formed in the opening portion 563A so as to protrude from the surface of the second cladding layer 56A. Further, a signal electrode 32B is formed in the opening portion 564A so as to protrude from the surface of the second cladding layer 56A. The signal electrode 32B and the ground electrode 53B are arranged on lateral sides of the PLZT waveguides 31A. As a result, the signal electrode 32B and the ground electrodes 53B are arranged on both sides of the PLZT waveguides 31A and an electric field is applied in the width direction (left to right (Z direction)), so that it is possible to further improve the modulation efficiency.

Meanwhile, for convenience of explanation, the case has been described in which, in the optical modulator 5A of the second embodiment, the first Si waveguide 21 and the PLZT waveguide 31A are directionally coupled. However, an appropriate change is applicable, and the first Si waveguide 21 and the PLZT waveguide 31A may be butt-coupled.

In FIG. 17, the relationship between the driving voltage and the electrode length with which the PLZT waveguide 31A has the electro-optic effect that is three times larger than that of the LN waveguide 121 is illustrated. However, even the PZT waveguide 31 is able to achieve the same effect as the PLZT waveguide 31A, and has the electro-optic effect that is three times larger than that of the LN waveguide 121.

Further, the thin-film substrates (50 and 55A) as single crystal perovskite oxides that have large electro-optic effects as compared to lithium niobate are illustrated. However, an appropriate change is applicable, and it may be possible to adopt a thin-film substrate made of a polycrystal perovskite oxide that has a large electro-optic effect as compared to lithium niobate. Furthermore, an appropriate change is applicable to the thin-film substrate, and the thin-film substrate may be a thin film without a slab.

According to one embodiment of the optical device and the like disclosed in the present application, it is possible to improve modulation efficiency and it is possible to reduce a device size and driving voltage.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical device comprising:
   a silicon substrate;
   a ground electrode that is laminated on the silicon substrate and that has a grounding potential;
   a first cladding layer that is laminated on the ground electrode;
   a waveguide formed of a thin film that is laminated on the first cladding layer and that is made of a perovskite oxide with larger electro-optic effect than lithium niobate;
   a second cladding layer that covers the waveguide; and
   a signal electrode that is laminated on the second cladding layer and arranged at a position facing the ground electrode across the waveguide and that applies driving voltage to the waveguide.

2. The optical device according to claim 1, further comprising:
   a lead zirconate titanate (PZT) waveguide as the waveguide formed of a thin film PZT as the thin film that is laminated on the first cladding layer and that is made of a perovskite oxide, wherein
   a crystal direction of the PZT waveguide is same as a direction of an electric field generated from the signal electrode to the ground electrode.

3. The optical device according to claim 2, further comprising:
   a silicon waveguide that is formed on the silicon substrate, wherein
   the silicon waveguide and the PZT waveguide are optically coupled.

4. The optical device according to claim 2, further comprising:
   a silicon waveguide that is formed on the silicon substrate;
   the first cladding layer that covers the silicon waveguide; and
   the second cladding layer that covers a thin-film PZT that forms the PZT waveguide, wherein
   a thickness of the first cladding layer between an upper surface of the silicon waveguide and a bottom surface of the thin-film PZT is set to 100 nanometers to 300 nanometers, and
   the silicon waveguide and the PZT waveguide are optically coupled.

5. The optical device according to claim 4, wherein
   an opening portion for exposing a part of the ground electrode is formed on the second cladding layer and the thin-film PZT, and
   a different ground electrode electrically connected to the ground electrode is arranged on the opening portion.

6. The optical device according to claim 3, further comprising:
   an optical input unit that inputs signal light to the PZT waveguide;

a modulator that applies the driving voltage to the PZT waveguide to change a refractive index of the PZT waveguide and modulate the signal light that passes through the PZT waveguide; and an optical output unit that outputs the modulated signal light from the modulator, wherein the PZT waveguide is arranged in the modulator, and the silicon waveguide is arranged in the optical input unit and the optical output unit.

7. The optical device according to claim 4, further comprising:

an optical input unit that inputs signal light to the PZT waveguide;

a modulator that applies the driving voltage to the PZT waveguide to change a refractive index of the PZT waveguide and modulate the signal light that passes through the PZT waveguide; and an optical output unit that outputs the modulated signal light from the modulator, wherein the PZT waveguide is arranged in the modulator, and the silicon waveguide is arranged in the optical input unit and the optical output unit.

8. The optical device according to claim 1, further comprising:

a barium titanate (BTO) waveguide as the waveguide formed of a thin-film BTO as the thin film that is laminated on the first cladding layer and that is made of the perovskite oxide, wherein a crystal direction of the BTO waveguide is same as a direction of an electric field generated from the signal electrode to the ground electrode.

9. The optical device according to claim 8, further comprising:

a silicon waveguide that is formed on the silicon substrate;

the first cladding layer that covers the silicon waveguide; and the second cladding layer that covers the thin-film BTO that forms the BTO waveguide, wherein a thickness of the first cladding layer between an upper surface of the silicon waveguide and a bottom surface of the thin-film BTO is set to 100 nanometers to 300 nanometers, and the silicon waveguide and the BTO waveguide are optically coupled.

10. The optical device according to claim 9, wherein opening portions are formed on the second cladding layer on both sides of the BTO waveguide, and the signal electrode is arranged on the second cladding layer above the BTO waveguide.

11. The optical device according to claim 9, wherein an opening portion for exposing a part of the ground electrode is formed on the second cladding layer and the thin-film BTO, and a different ground electrode that is electrically connected to the ground electrode is formed on the opening portion.

12. The optical device according to claim 9, further comprising:

an optical input unit that inputs signal light to the BTO waveguide;

a modulator that applies the driving voltage to the BTO waveguide to change a refractive index of the BTO waveguide and modulate the signal light that passes through the BTO waveguide; and an optical output unit that outputs the modulated signal light from the modulator, wherein the BTO waveguide is arranged in the modulator, and the silicon waveguide is arranged in the optical input unit and the optical output unit.

13. The optical device according to claim 8, wherein a Peltier device is mounted on a surface opposite to a surface on which the silicon substrate is laminated.

14. An optical device comprising: a silicon substrate; a first cladding layer that is laminated on the silicon substrate; a lanthanum-doped lead zirconate-lead titanate (PLZT) waveguide as a waveguide formed of a thin-film PLZT as a thin film that is laminated on the first cladding layer and that is made of a perovskite oxide; a second cladding layer that covers the PLZT waveguide; a signal electrode that is arranged on the second cladding layer and that applies the driving voltage to the PLZT waveguide; and a pair of ground electrodes that are arranged on the second cladding layer so as to sandwich the signal electrode, wherein a crystal direction of the PLZT waveguide is same as a direction of an electric field generated from the signal electrode to the pair of ground electrodes, wherein the signal electrode and the ground electrodes are arranged on opening portions that are formed on the second cladding layer positioned at lateral sides of the PLZT waveguide.

15. The optical device according to claim 14, further comprising:

a silicon waveguide that is formed on the silicon substrate, wherein the silicon waveguide and the PLZT waveguide are optically coupled.

16. The optical device according to claim 14, further comprising:

a silicon waveguide that is formed on the silicon substrate;

the first cladding layer that covers the silicon waveguide; and the second cladding layer that covers the thin-film PLZT that forms the PLZT waveguide, wherein a thickness of the first cladding layer between an upper surface of the silicon waveguide and a bottom surface of the thin-film PLZT is set to 100 nanometers to 300 nanometers, and the silicon waveguide and the PLZT waveguide are optically coupled.

17. The optical device according to claim 15, further comprising:

an optical input unit that inputs signal light to the PLZT waveguide;

a modulator that applies the driving voltage to the PLZT waveguide to change a refractive index of the PLZT waveguide and modulate signal light that passes through the PLZT waveguide; and an optical output unit that outputs the modulated the signal light from the modulator, wherein the PLZT waveguide is arranged in the modulator, and the silicon waveguide is arranged in the optical input unit and the optical output unit.

18. The optical device according to claim 16, further comprising:

an optical input unit that inputs signal light to the PLZT waveguide;

a modulator that applies the driving voltage to the PLZT waveguide to change a refractive index of the PLZT waveguide and modulate the signal light that passes through the PLZT waveguide; and an optical output unit that outputs the modulated the signal light from the modulator, wherein the PLZT waveguide is arranged in the modulator, and the silicon waveguide is arranged in the optical input unit and the optical output unit.

19. An optical communication apparatus comprising:
a processor that performs signal processing on an electrical signal;
a light source that generates light; and
an optical device that modulates the light generated from the light source by using an electric field output from the processor, wherein
the optical device includes
- a ground electrode that is laminated on a silicon substrate and that has a grounding potential;
- a first cladding layer that is laminated on the ground electrode;
- a waveguide formed of a thin film that is laminated on first cladding layer and that is made of a perovskite oxide with larger electro-optic effect than lithium niobate;
- a second cladding layer that covers the waveguide;
- a signal electrode that is laminated on the second cladding layer and arranged at a position facing the ground electrode across the waveguide and that applies driving voltage to the waveguide.

* * * * *